United States Patent [19]

Harrison et al.

[11] 4,419,701

[45] Dec. 6, 1983

[54] DATA TRANSDUCER POSITION CONTROL SYSTEM FOR ROTATING DISK DATA STORAGE EQUIPMENT

[75] Inventors: Joel N. Harrison, Campbell; Donald V. Daniels, Santa Cruz; Bruce R. Peterson, San Jose, all of Calif.

[73] Assignee: Quantum Corporation, Milpitas, Calif.

[21] Appl. No.: 304,209

[22] Filed: Sep. 21, 1981

[51] Int. Cl.³ ...................... G11B 17/00; G11B 21/00
[52] U.S. Cl. ..................................................... 360/77
[58] Field of Search .................... 360/60, 77, 75, 78, 360/10.2; 369/43, 47

[56] References Cited

U.S. PATENT DOCUMENTS 4,335,408 6/1982 Dintes ................................. 360/77
4,378,519 3/1983 DuVall ............................ 360/77 X Primary Examiner—Robert L. Richardson
Attorney, Agent, or Firm—David B. Harrison

[57] ABSTRACT

Improvements in a system for controlling the position of a head carriage structure of a rotating disk data storage system are disclosed. The improvements include circuitry for generating a polyphase track boundary signal which compensates for drift, and which doubles or further increases the track density to increase storage capacity. A track centerline sensor circuit is greatly simplified by including the function thereof as microcode routines within a dedicated digital control processor. Error signals are measured periodically across the entire useful field of the disk, and they are constantly updated, so that improved compensation for drift, runout and offset of the disk relative to the data transducer is achieved. Track overshoot during track seeking movements of the transducer is accomodated, enabling reduced track average access time. Self contained diagnostic routines and a direct digital read out provide system status and error messages to operators and maintenance personnel, thereby facilitating maintenance and adjustment.

16 Claims, 15 Drawing Figures

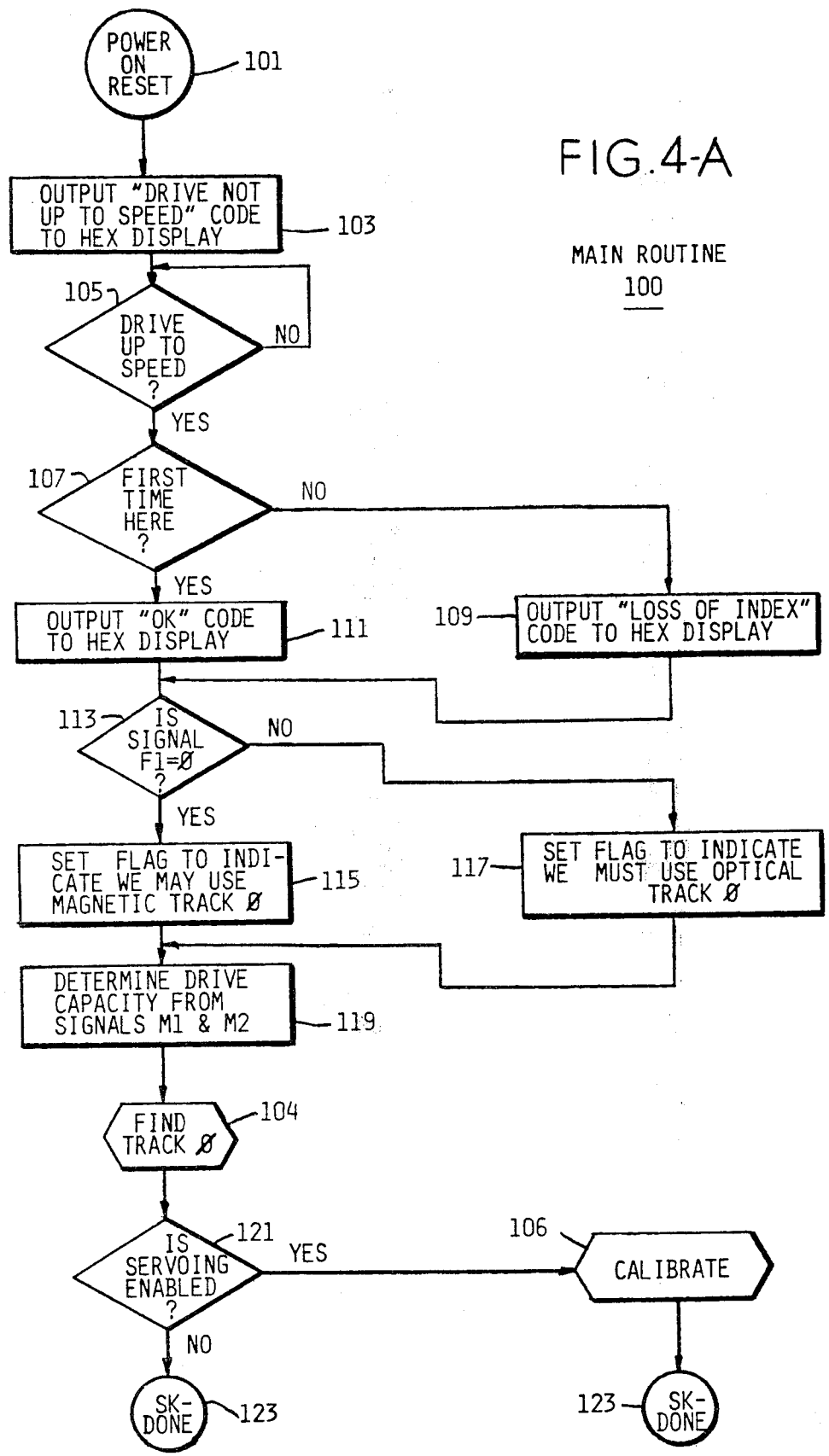
FIG.4-A
MAIN ROUTINE
100

MAIN ROUTINE
100 (continued)

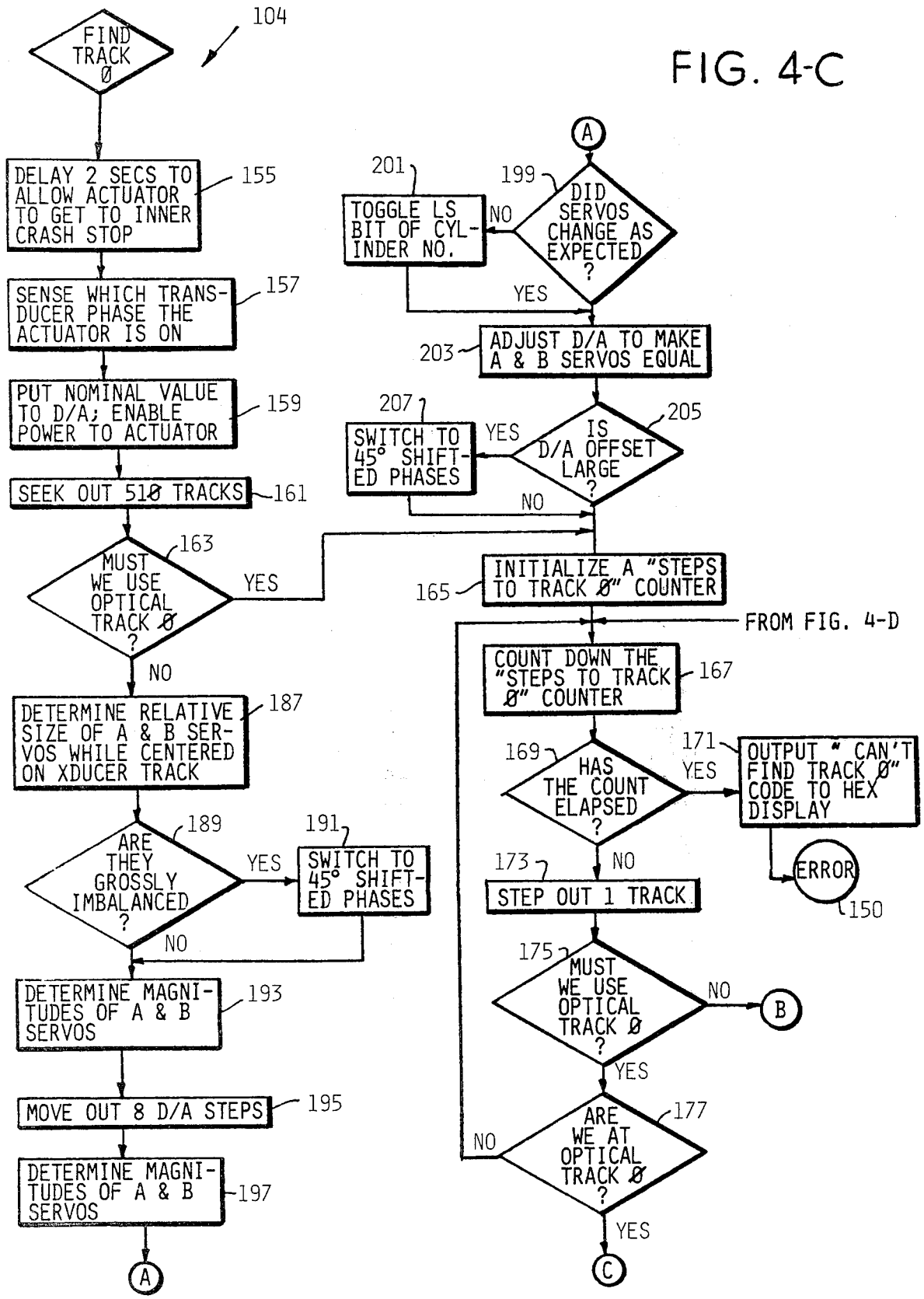
FIG. 4-C

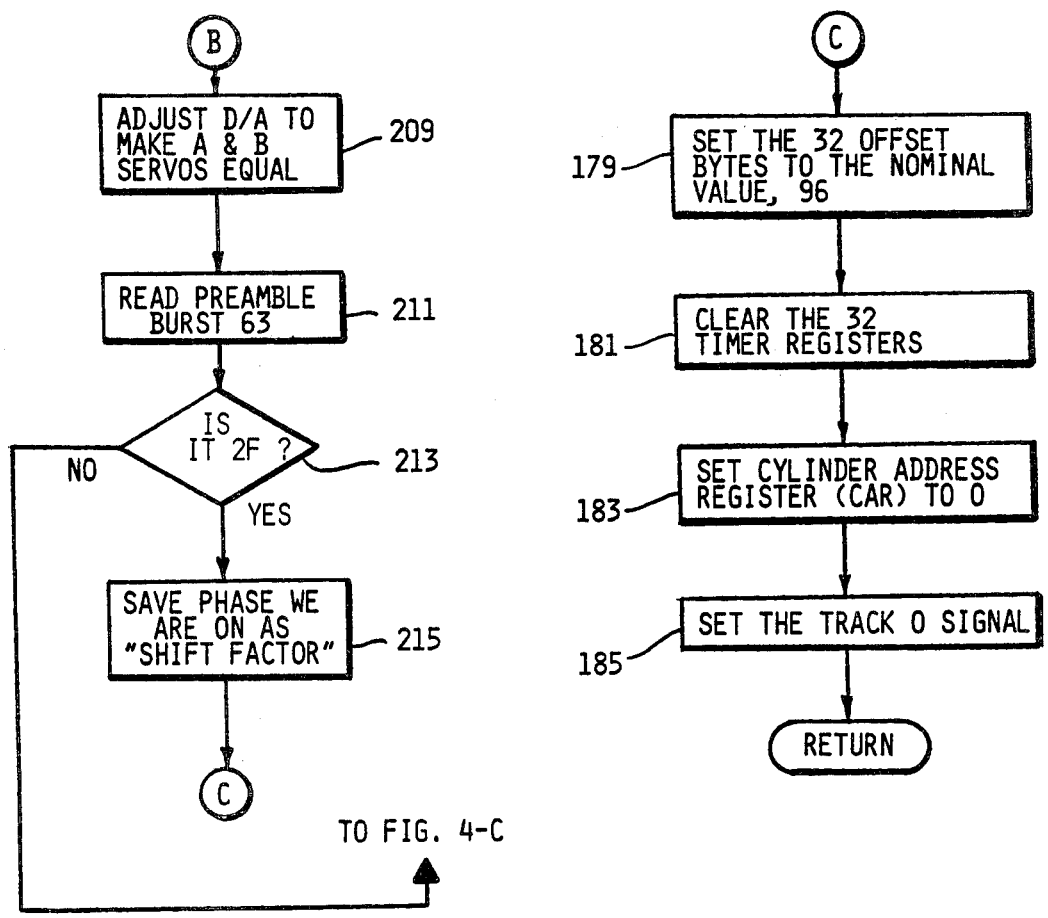
FIG.4-D

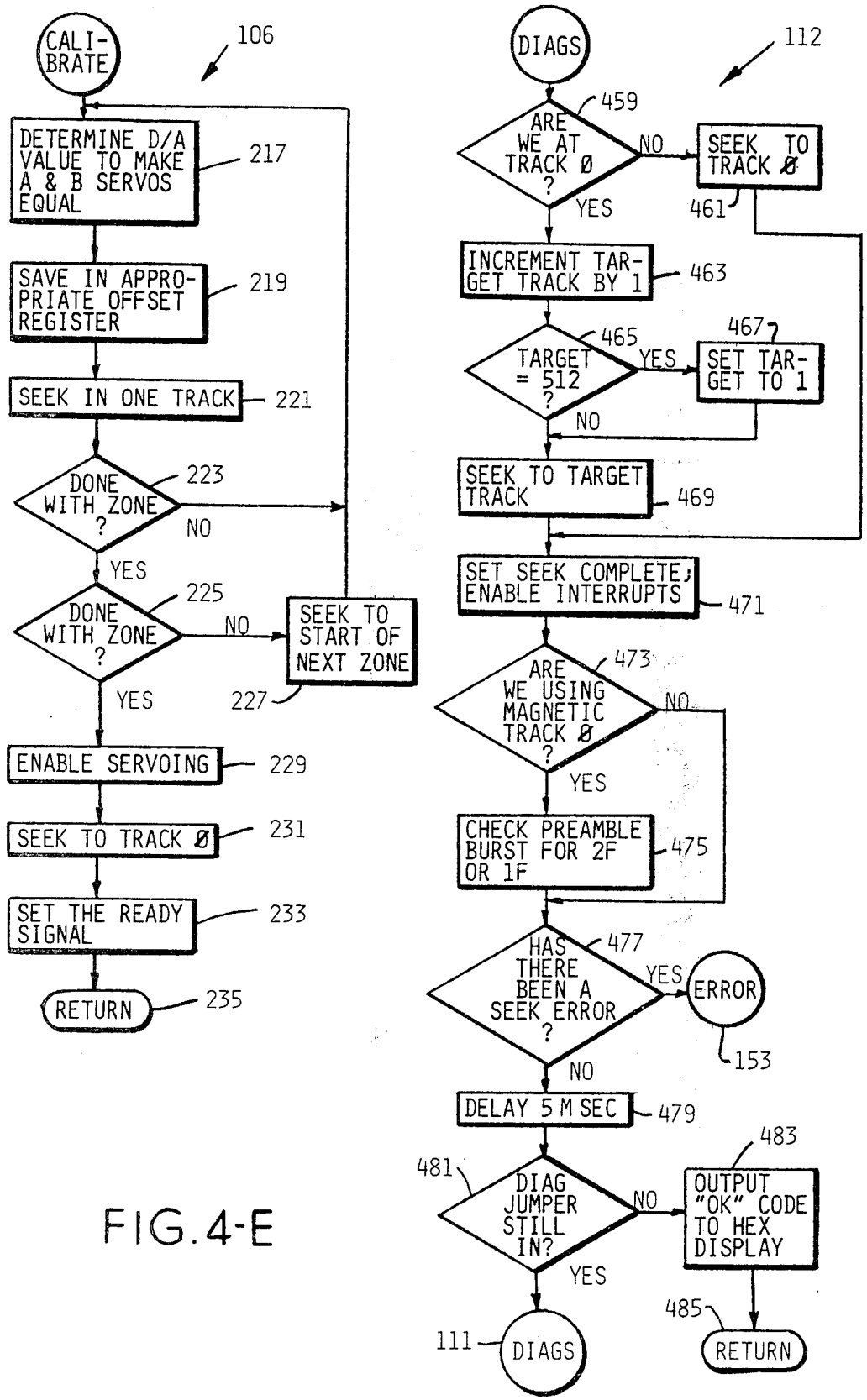
FIG.4-E

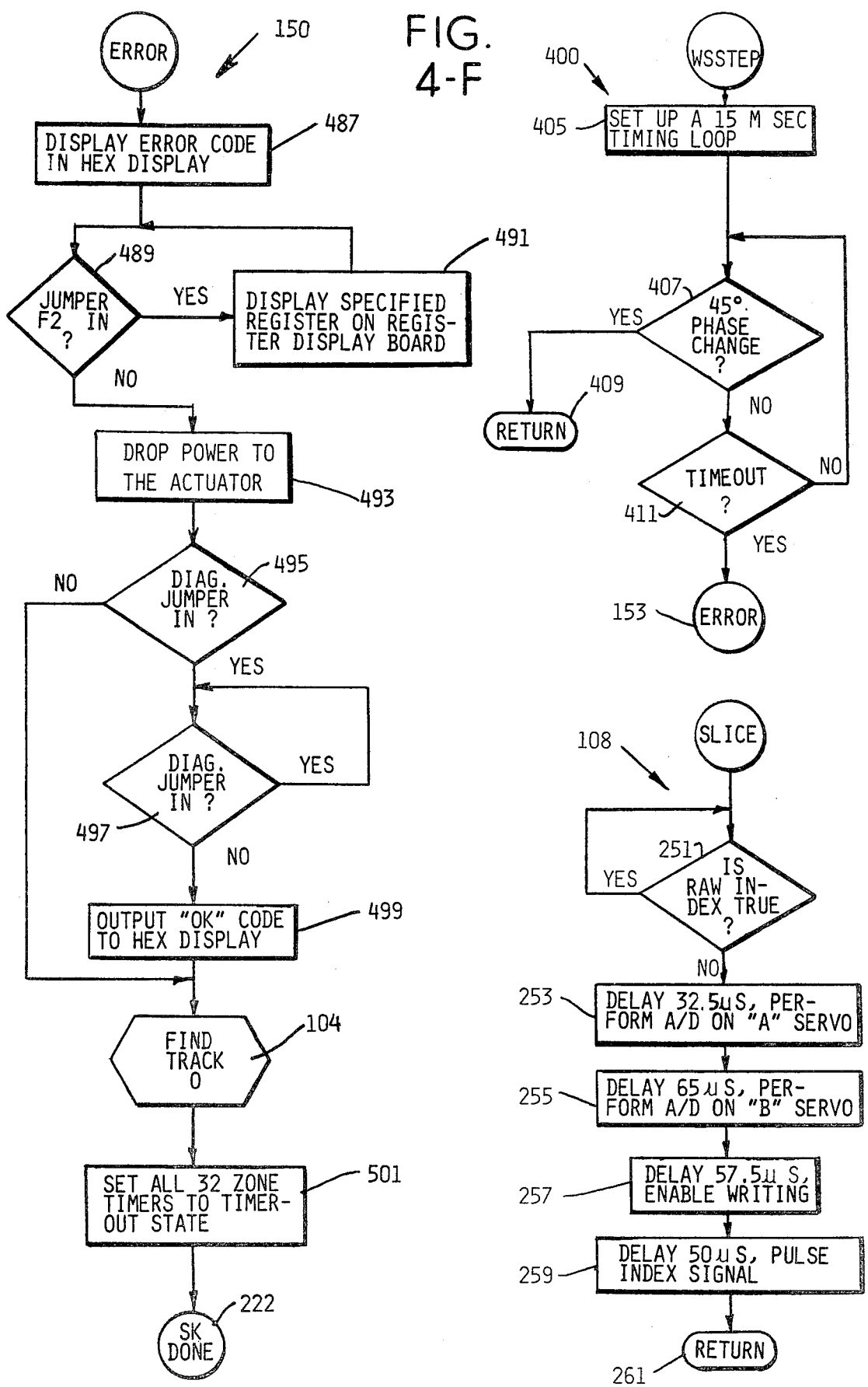
FIG. 4-F

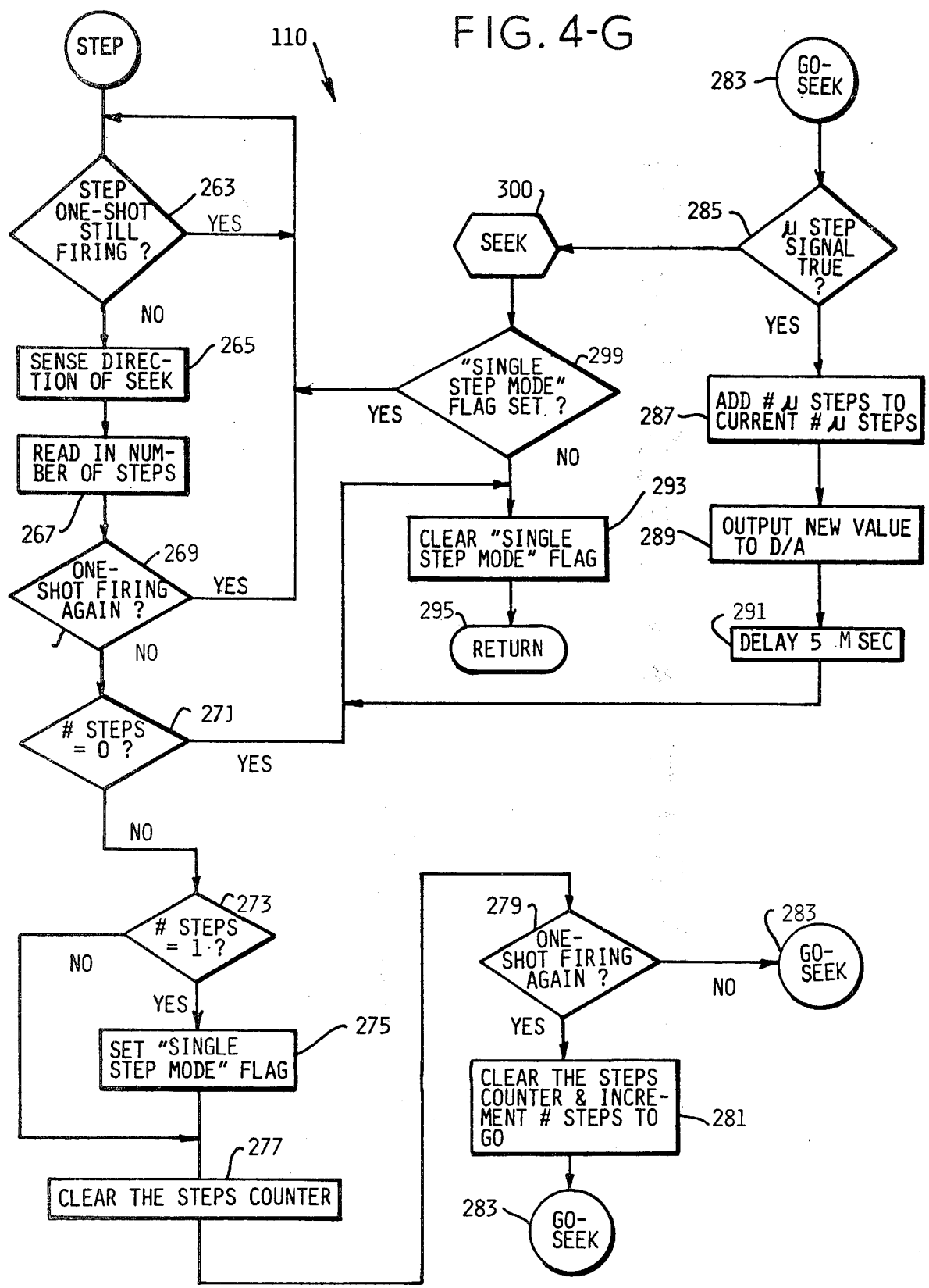
FIG. 4-G

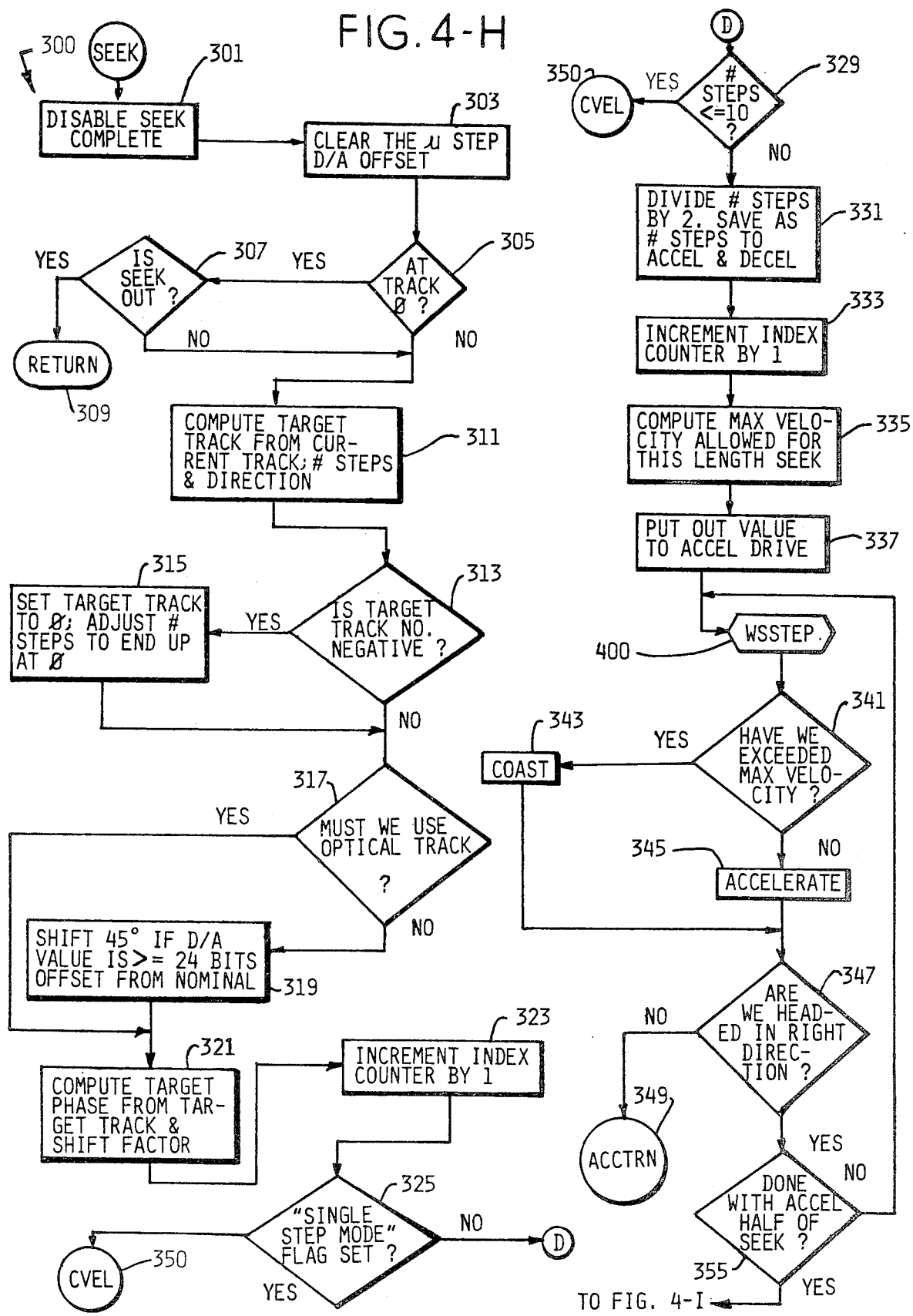
FIG. 4-H

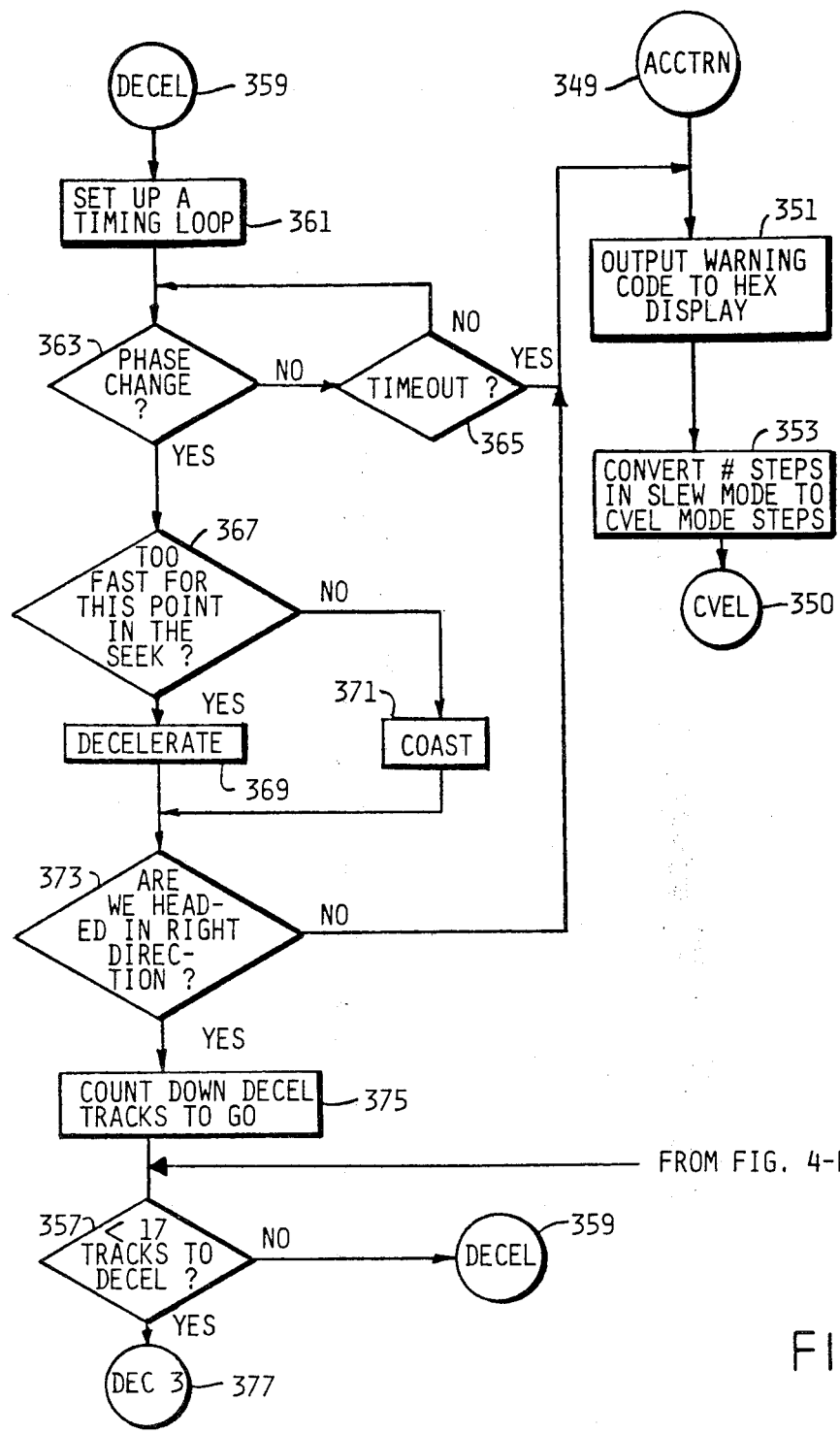
FIG. 4-I

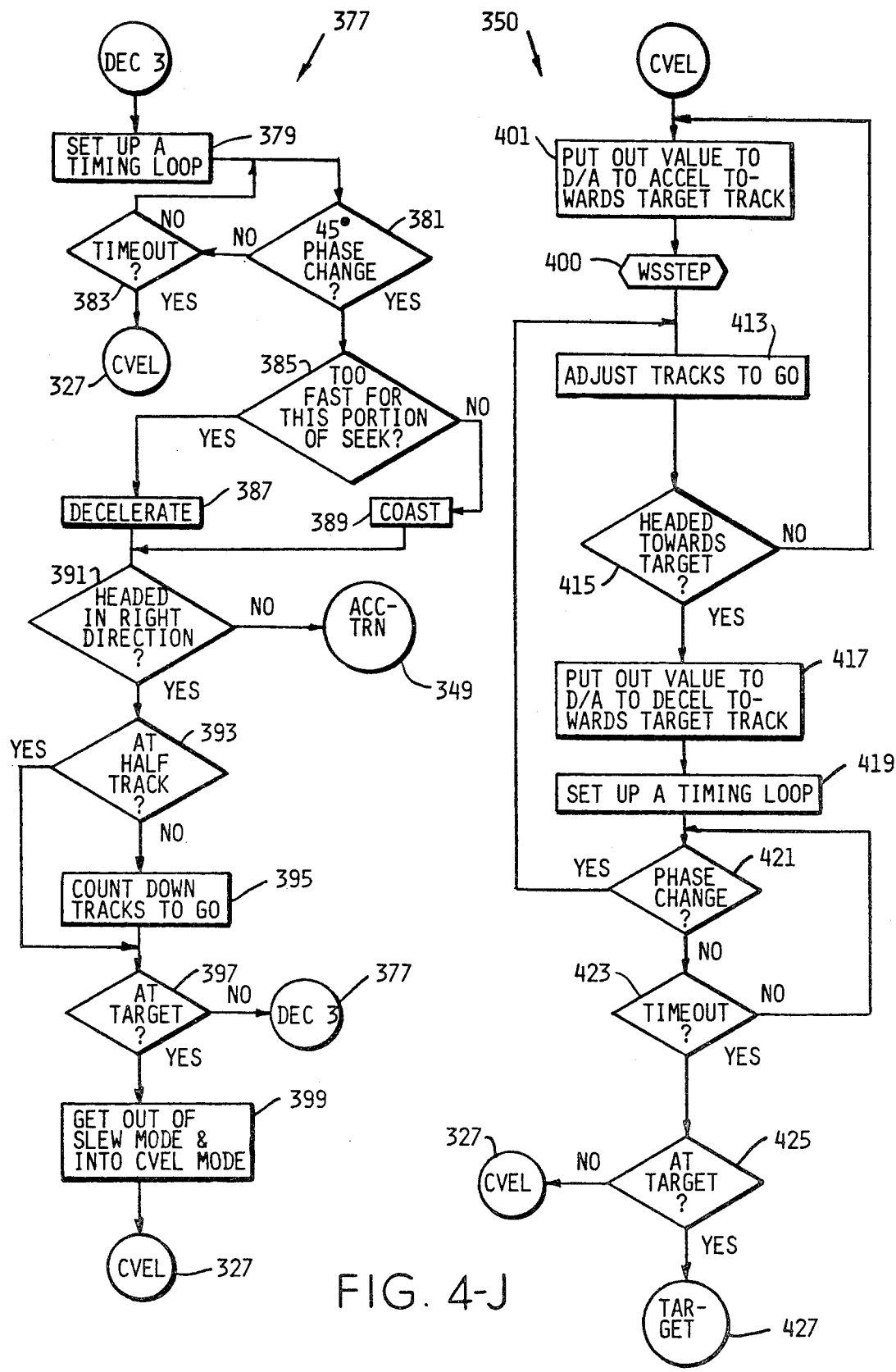
FIG. 4-J

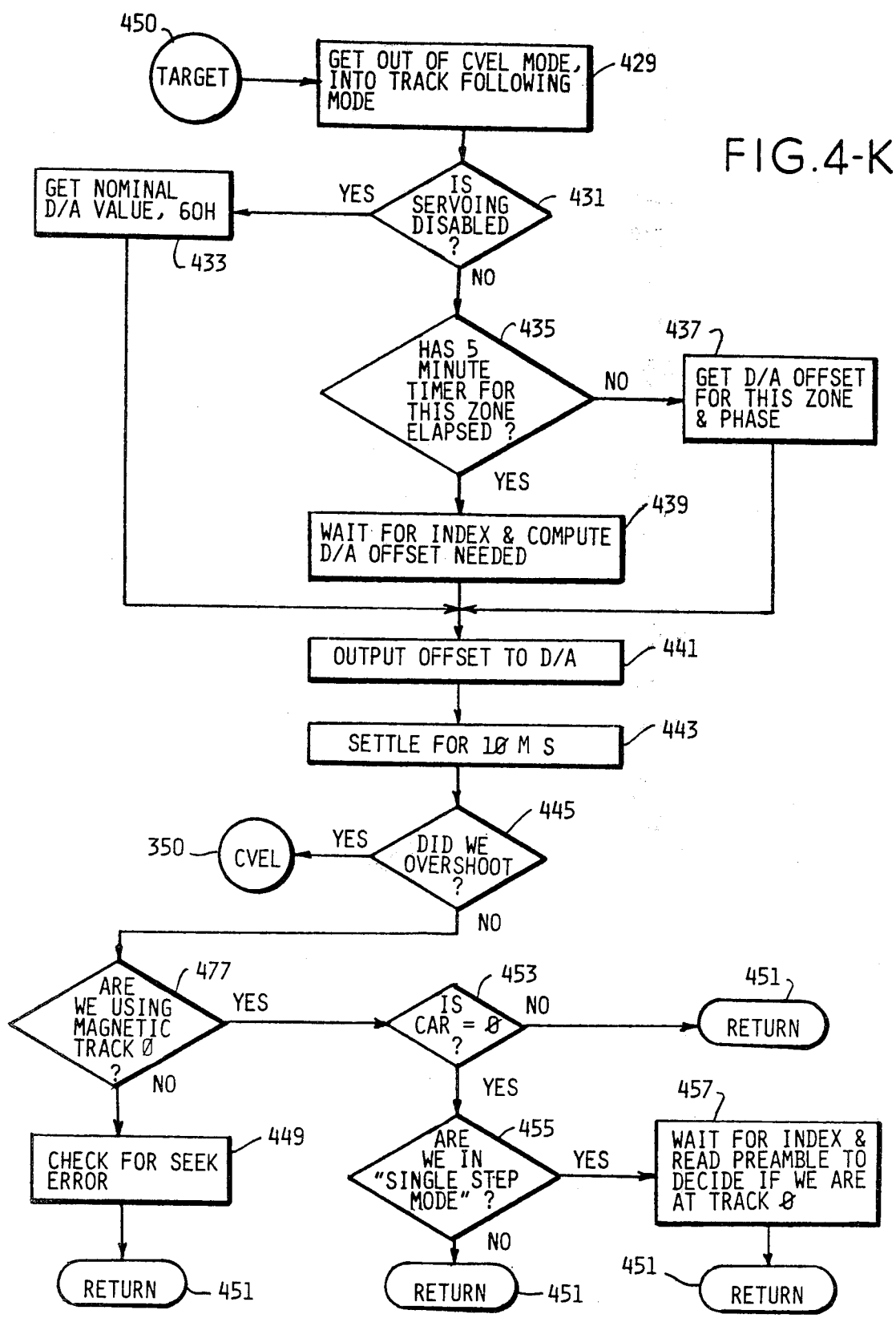
FIG.4-K

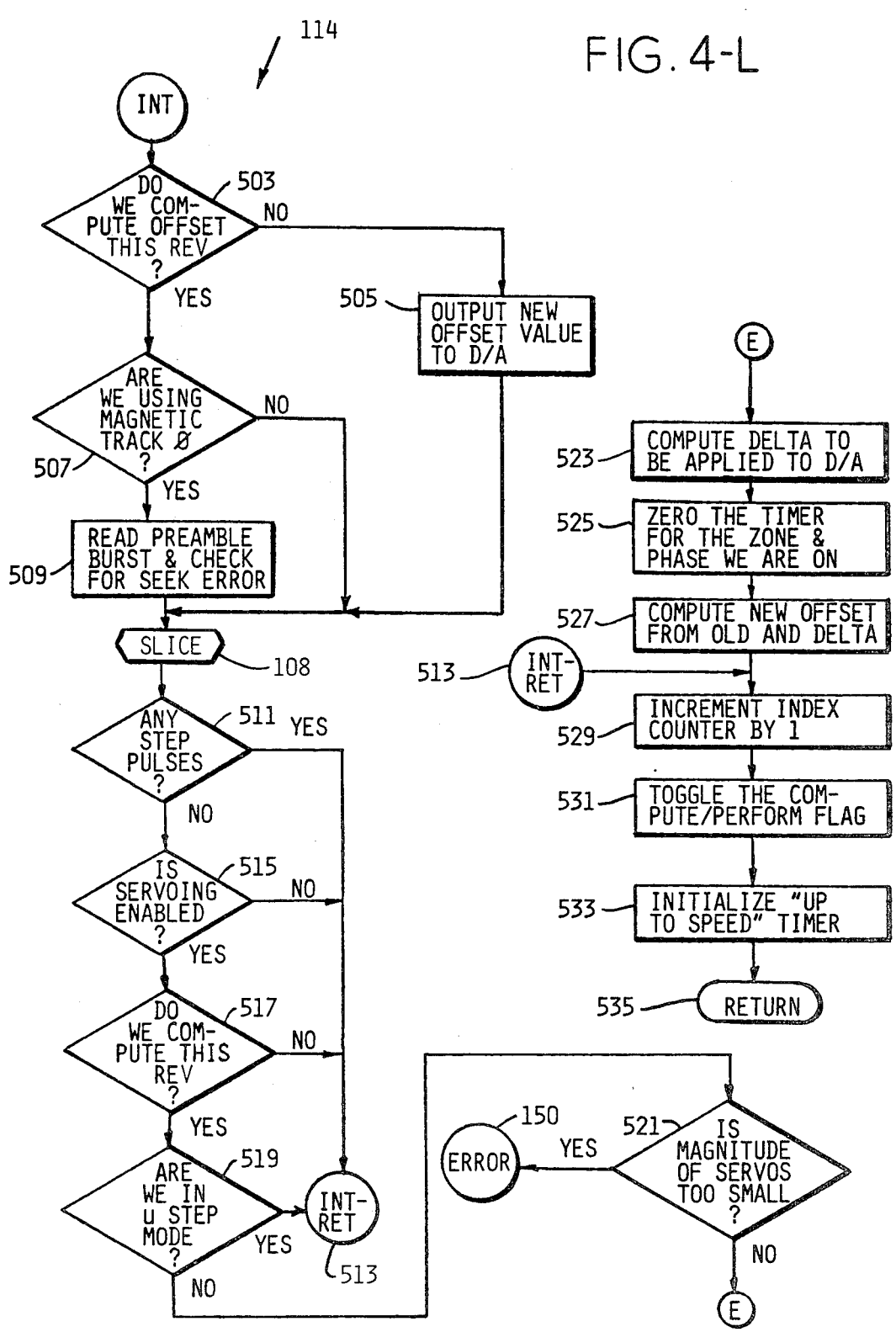
FIG. 4-L

DATA TRANSDUCER POSITION CONTROL SYSTEM FOR ROTATING DISK DATA STORAGE EQUIPMENT

BACKGROUND OF THE INVENTION

This invention relates to improvements in position control systems and methods for translating one member relative to another. More particularly, this invention relates to improvements in methods and apparatus for moving a data memory device member, such as a data transducer, relative to another member, such as a rotating disk having a multiplicity of available concentric data cylinders or tracks, and keeping the moved member in alignment with a selected track of the other member.

U.S. Pat. Application Ser. No. 06/190,198 was filed on Sept. 24, 1980, by Joel N. Harrison, Donald V. Daniels, and David A. Brown, for an invention entitled Data Transducer Position Control System for Rotating Disk Data Storage Equipment. That application, assigned to Quantum Corporation, the assignee of the present application, disclosed one solution to the problem of accurately controlling the position of a data transducer relative to selected ones of a multiplicity of adjacent concentric annular tracks. Reference to that application is suggested to those readers desiring further particulars. While that prior solution worked well and constituted a significant improvement over other prior art approaches available up to that point, it had the drawback of complexity in the electronic hardware thereof. Since then, significant further improvements have been made by the present inventors to increase reliability and capacity of the system and at the same time significantly reduce hardware complexity. These improvements are the subject of this patent application.

SUMMARY OF THE INVENTION

A general object of the present invention is to improve the system for controlling the data transducer in rotating disk data storage equipment.

Another object of the present invention is to improve the performance and reliability of a rotating disk data storage device while reducing its complexity and cost of manufacture.

A further object of the present invention is to double the capacity of a rotating disk data storage device without increasing its complexity or its cost of manufacture.

Yet another object of the present invention is to provide a rotating disk data storage device with a pure torque generating actuator for moving a data transducer between tracks in response to step signals intended to operate a discontinuous stepper motor actuator.

A still further object of the present invention is to utilize a monolithic programmed digital processor to command and control the position of a data transducer in rotating disk data storage equipment in a manner which is efficient, effective and reliable over the useful life of the equipment.

One more object of the present invention is to provide a rotating disk data storage device with internal diagnostics and a direct digital readout indicating status and error modes of the device, to facilitate and enhance maintenance and adjustment.

The objects of the present invention are achieved in the environment of electromechanical equipment, such as for example a rotating disk data storage device, wherein a moving data transducer seeks a selected one of a multiplicity of concentric data tracks and remains approximately centered in the selected track during data storage and retrieval operations. The transducer is linked to a track-to-track sensor which generates an analog polyphase signal. The polyphase signal is electrically processed to define nominal boundaries between adjacent tracks. A track centerline sensor reads signals indicative of transducer position within each track from data stored in a narrow servo sector on a disk surface once during each revolution of the disk and a digital processor computes an error signal indicative of the distance the transducer is offset from sensed centerline. The digital processor commands the data transducer to move to a desired track in an open loop control mode in accordance with externally supplied track select data. Once the transducer has reached the selected track, the processor repetitievly reads the error signal from the centerline sensor, computes the error signal and commands the transducer to move into and remain in alignment with the centerline in a closed loop mode during data storage and retrieval operations.

One improvement of the present invention includes circuitry which electrically generates polyphase signals which compensate for sensor drift between the true track as sensed by the track centerline sensor and the track boundary as sensed by the track-to-track sensor, so that the digital processor will enjoy a sufficient range of control for each track to keep the transducer therewithin without perturbation or disturbances.

Another improvement of the present invention includes circuitry for increasing the number of polyphase signals generated by the track-to-track sensor, which, when combined in a system having a data transducer resolving to half the original track width, effectively doubles the data storage capacity of the device by doubling the number of available data tracks.

Another improvement of the present invention includes simplified circuitry for implementing the track centerline sensor by replacing switching, sampling and holding circuitry with programmed functions of the digital processor.

A further improvement of the present invention includes measuring and storing error signals for representative tracks of each phase within zones of tracks evenly distributed across the entire useful field of the disk, and periodically updating the stored error signals with newly sensed data, so that the drift, runout and offset characteristics of the device are recurrently and accurately corrected over the entire range of operation of the transducer.

One more improvement of the present invention includes an open loop control mode for track seeking operations which accomodates track overshoot by the transducer, senses an overshoot, and commands a return to the destination track, thereby improving track average access times during track seeking.

One more improvement includes circuitry which receives pulse streams intended to actuate a stepper motor, and converts those pulses into one or more step commands to move a pure torque generating actuator to the track commanded by the number of pulses in the stream.

Yet another improvement of the present invention includes circuitry providing a direct digital readout of status and error messages at the device, to aid maintenance and alignment thereof.

Other and further objects of the present invention will be apparent from the following description and claims and are illustrated in the accompanying drawings which, by way of illustration, show preferred embodiments of the present invention and the principles thereof and what are now considered the best modes contemplated for these principles. Other embodiments of the invention embodying the same or equivalent principles may be used and structural and circuit changes may be made as are desired by those skilled in the art without departing from the present invention and the purview of the appended claims.

BRIEF DESCRIPTION OF THE DRAWINGS

In the Drawings:

FIGS. 4A–4L sets forth a detailed flowchart expositive of the operation of the programmed microprocessor controller element of the FIG. 1 system.

DESCRIPTION OF A PREFERRED EMBODIMENT

Figure 1:
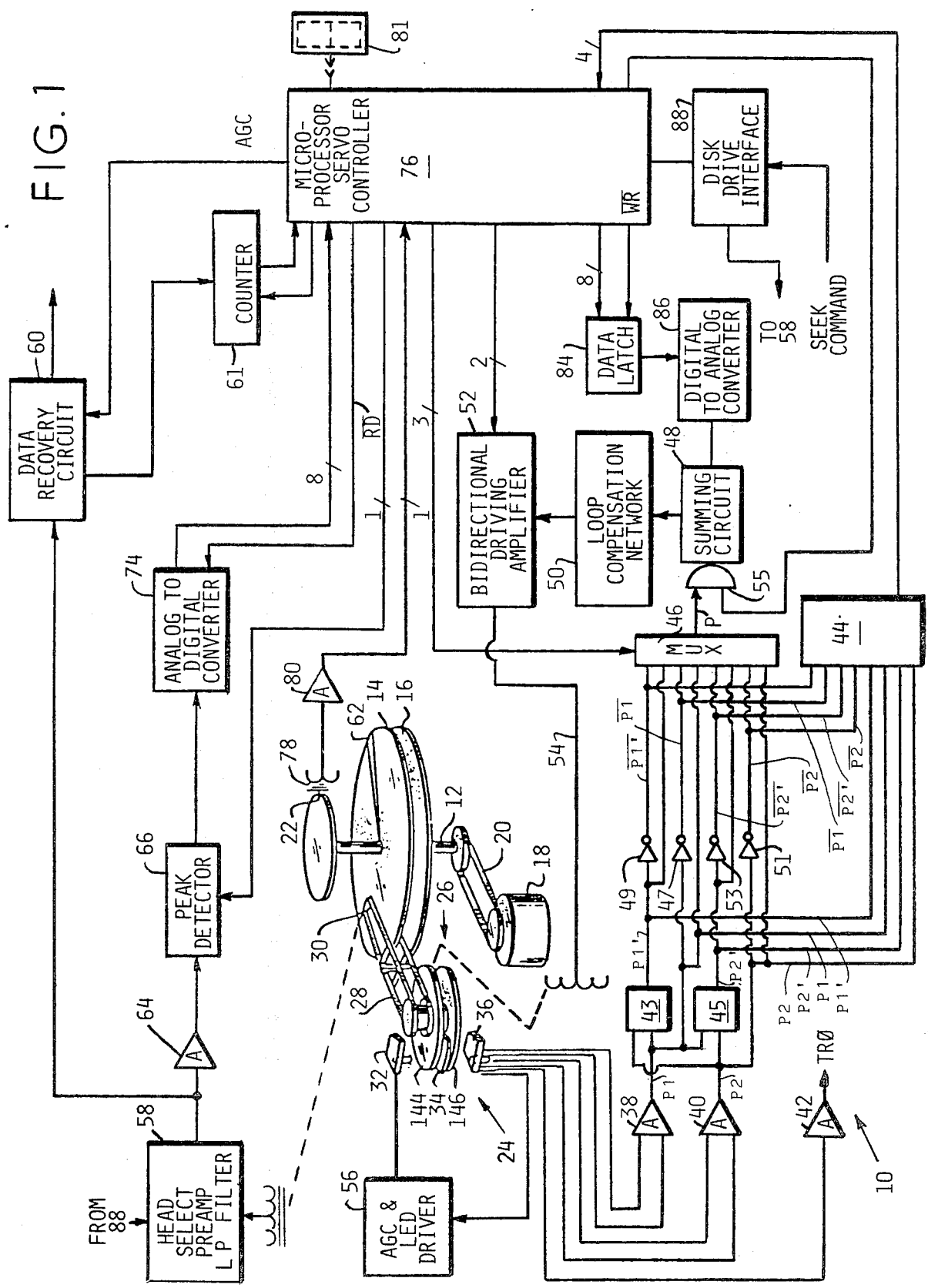
FIG. 1 is an overall system block diagram illustrating the principles of the present invention.

The following description incorporates by reference some of the description set forth in the Harrison et al. patent application, supra. Elements common to the data storage device of that prior application with the device 10 of the present invention bear the same reference numerals.

Referring to FIG. 1, the improved rotating disk data storage device 10 illustrated in the block diagram overview thereof is one in which a drive spindle 12 and one to four approximately eight inch diameter data storage disks (two disks 14 and 16 are depicted) are caused to rotate about the common axis of the spindle at e.g. 50 Hz by a suitable disk drive motor 18 with pulleys and a drive belt 20 in conventional fashion. The system 10 may include as many as four or more data storage disks, and disk diameters such as fourteen inches or five and one quarter inches are useable, although eight inches is presently preferred. While magnetic surface disks are described in this presently prefered embodiment, the present invention may be effectively utilized with other kinds of data storage devices, including laser etched and erased disks, or other forms of optical storage devices. As magnetic media, the disks 14 and 16 may be formed of a thin aluminum sheet having an oriented ferric oxide or other suitable magnetic coating on the major surfaces thereof. An index marker 22 provided on the spindle 12 provides an index pulse with each rotation of the drive. The index is used to control servo operations in a manner described hereinafter, and it also serves as part of a tachometer to check that the disks 14,16 are rotating at the intended operational velocity.

A head carriage assembly 24 journalled to the frame of the device 10 includes a pure torque generating rotor 26 to which head support beams are mounted for radial movement relative to the disks 14, 16. The rotor 26 is described in greater detail in the Harrison et al. copending patent application, Ser. No. 06/190,198, FIGS. 9–12. Read and write transducers (heads) 30 are secured at the periphery of the support beams 28, and these heads may be of the type which ride upon an air bearing effect in accordance with what has come to be known in the art as Winchester technology.

Figure 3:
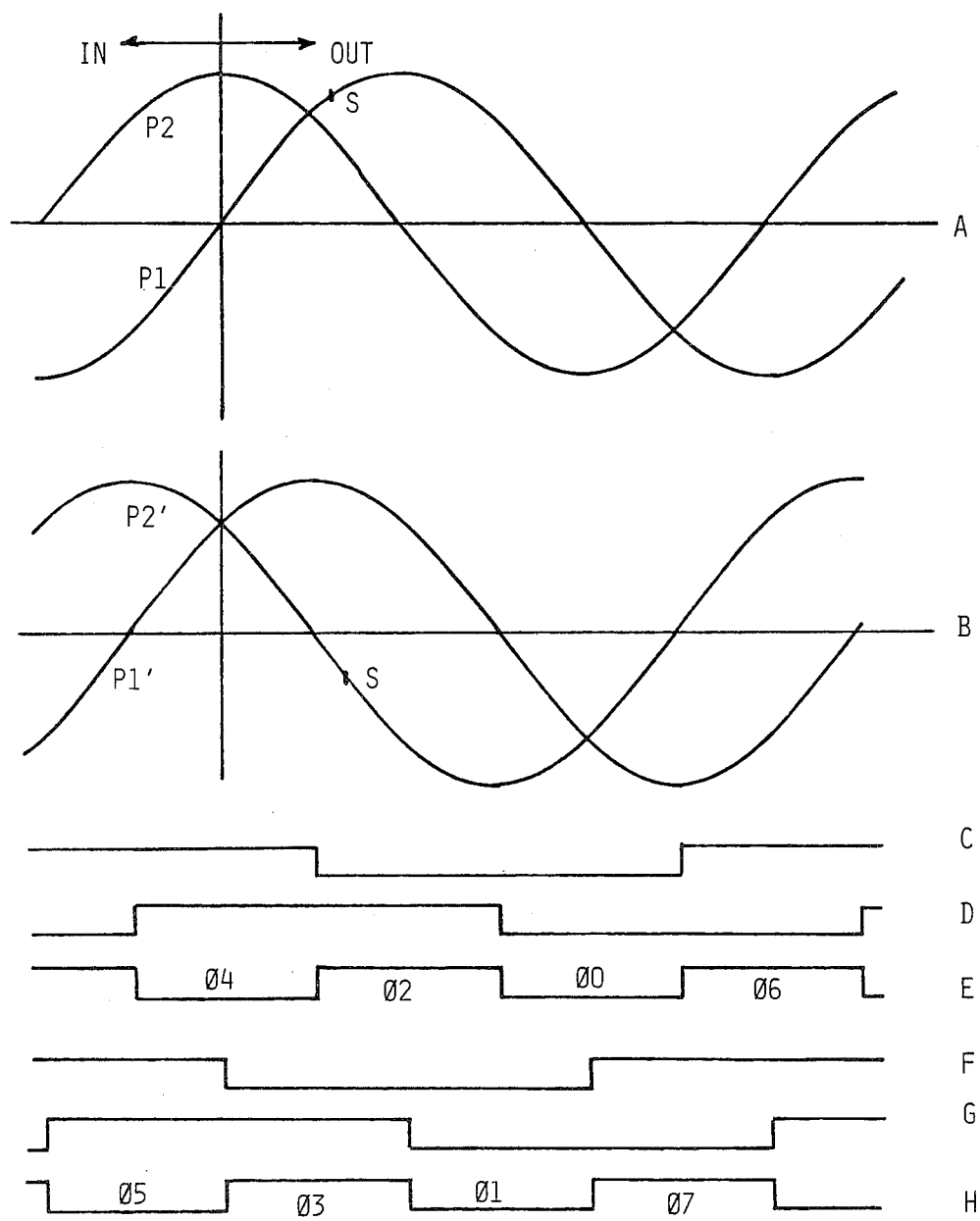
FIG. 3 is a series of analog and digital quadrature track boundary and servo range waveform diagrams which are generated from the track boundary sensor element of the FIG. 1 system.

A nominal track boundary sensing electro-optical transducer includes a controlled current light emitting diode source 32, a scale 34 having a series of equally closely spaced microscopic radial lines, and an integrated circuit photo sensitive reticle-masked array 36, which in combination produce light and dark polyphase (e.g. quadrature) signals or phasors. The phasors are used to generate the track boundary waveforms depicted in FIG. 3A. Further details of the electro-optical transducer may be found in the copending Harrison et al. application, and also in U.S. Pat. No. 4,224,514, assigned to Sensor Technology, Inc., of Chatsworth, Calif. This latter patent describes one form of sensor array which may be used for the array 36. Other arrays and methods of fabrication are also useful for the array 36.

There are six outputs from the photo sensitive array: four quadrature signals, an optical track 0 signal, and an automatic gain control signal. The four quadrature signals are processed by two differential amplifiers 38 and 40 to provide the P1 and P2 signals depicted in Waveform A of FIG. 3. Although the P1 and P2 waveforms are depicted as sine waves, in practice these signals are somewhere between a pure sine wave and a triangular sawtooth wave. The depicted sine waves are by way of illustration only, as the device 10 works well with either sine or triangular waveshapes. An optical track 0 signal is put out to a digital processor 76 by an ampifier 42 connected to the photo sensitive array 36.

The sensed quadrature phasors P1 and P2 from the amplifiers 38 and 40 are sent as electrical analogs to two amplifiers 43 and 45 which function as analog phase multipliers. The output of the amplifier 43 provides a signal P1' which is the P1 signal shifted by a predetermined phase shift, in this case selected to be 45 degrees. The output of the amplifier 45 likewise provides a signal P2' which is the P2 phasor shifted by 45 degrees.

Four analog inverters 47, 49, 51, and 53 are connected and function respectively to convert P1 to NOT P1, P2 to NOT P2, P1' to NOT P1', and P2' to NOT P2', so that there are eight separate electrical phasors, each separated by 45 degrees and spaced throughout one complete phase of operation of the electro-optical transducer. The eight phasors enter an eight-to-one analog multiplexer 46 which selects and latches one of the phasors P in accordance with a three bit digital phasor select command from the microprocessor 76. A comparator circuit 44 is connected to convert the phasors into square waves, depicted as waveforms C, D, F, and G of FIG. 3. The exclusive-OR of waves C and D yields sensed track boundaries 0, 2 4, and 6 of Waveform E. The exclusive-OR of waves F and G yields derived track boundaries 1, 3, 5 and 7 of Waveform H. These eight track boundary signals are sent to the controller 76 by the comparator 44 which keeps track of head position by incrementing and decrementing a track position counter as track boundaries are crossed.

The selected phasor P (a continuous sine function) put out from the multiplexer 46 is supplied to a summing network 48 through a gate 55 controlled by the microprocessor controller 76 and on through a loop compensation (damping) network 50, a bidirectional moving coil motion driving amplifier 52 and ultimately to the armature of the rotor 26 via a bidirectional rotation driving line 54. The analog value produces a correction torque to keep the heads 30 within the boundaries of each data track defined electrically from the quadrature signals produced by the electro-optical sensor.

The light emitting diode source 32 of the sensor is powered by a driver circuit 56 which receives the agc control signal from the detector array 36 and puts out light of uniformly regulated intensity directed to the array 36.

Figure 2:
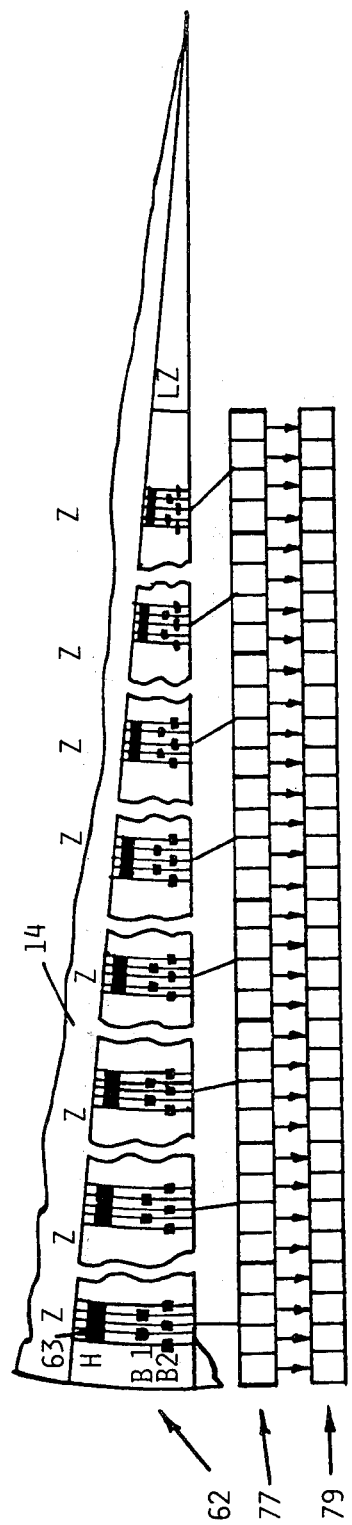
FIG. 2 is an enlarged and diagrammatic plan view of the control sector wedge portion of a disk surface which has been broken into zones with only a few of each track of each zone shown, in order to save drawing room.

One disk operating surface is preferably provided with a narrow, approximately 200 bytes long sector 62, which is depicted diagramatically in FIGS. 1 and 2. Each data track, from track 0 (outermost track) to track 511 (innermost track) is provided with factory prerecorded data, including a 200 byte sector header used to define track 0 and two staggered and offset frequency bursts, a first burst B1 on the outside half of e.g. odd tracks (and inside half of e.g. even tracks) and a second occuring burst B2 on the inside half of odd tracks (outside on even tracks). The sector bursts for the track at which the transducer 30 is located are factory prerecorded at the same frequency and amplitude. They are read every other revolution by the processor 76 and are used to provide a track centerline position servo loop control signal to the rotor 26 in the form of an offset correction value which urges the head 30 into alignment with track centerline.

Each burst is read in its turn and its peak amplitude is detected with a peak detector 66 under the control of the processor 76 to provide peak amplitude values. These values are sequentially gated to a fast analog to digital converter 74 which converts each of them to an eight bit digital word. The converter 74 is preferably a type ADC 0804 made by National Semiconductor or Intersil. These words are processed in the digital microprocessor controller 76. The microprocessor is preferably an Intel type 8049 which contains a 2k byte factory preprogrammed read only program and data memory holding the FIG. 4 control program and data base, and a 128 byte random access scratchpad memory for temporary storage of control values generated during operation of the drive 10.

A detector 78 detects the index pulse 22 on the drive spindle 12 with each revolution. This index clock signal is shaped in an amplifier 80 and sent to the controller 76 where it serves as a digital tachometer to measure disk speed and as a servo sector interrupt to inform the controller 76 at the beginning of each pass over the servo sector by the head 30.

Referring to FIG. 2, it is seen that the sector 62 has been divided into eight separate zones, Z0, Z1, Z2, Z3, Z4, Z5, Z6, Z7. Each zone contains 64 separate tracks in this presently preferred embodiment. While the transducer 30 is positioned over a selected track, the offset correction value associated with that track (same zone and phase) is repetitively and continually updated and a timer 79 associated with this track is continually reset. Meanwhile, 31 other timers, each associated with a particular zone and phase, will count normally. When a seek to a track with a different zone or phase is commanded, if the timer for the newly selected track has not elapsed (each timer elapses in about 5 minutes) the stored away offset value is applied to a digital to analog converter (DAC) 86 at the end of the seek operation. If, however, the timer 79 associated with the new track had elapsed, at the end of the seek to this new track, the processor 76 waits for an index pulse 22, reads the servo bursts B1 and B2 and calculates and performs centerline correction before enabling the host computer or user to have access to the data stored or to be stored on the new track.

It will be appreciated by inspection of FIG. 2 that servo bursts on the innermost tracks of zone Z8 are much smaller in amplitude than bursts on the outermost tracks of zone Z1. Consequently, in order to calculate a valid offset signal for fine position servo purposes, it is necessary to calculate the percentage of difference between burst amplitudes with the controller 76. This calculation automatically yields as a byproduct an automatic gain control (agc) signal for each track, a signal which may be applied to the data recovery circuit 60 or to other circuits for providing gain equalization to recovered data.

The prerecorded data header on all tracks, exept the outermost track 0, is recorded at a predetermined frequency. The prerecorded data header 630 of the outermost track 0 is prerecorded at another frequency, preferably twice that of the other headers H. The header bursts H are counted by a counter 61 connected between the data recovery circuit and the controller 76. Prior to each count sequence, the controller 76 clears the counter 61. Track 0 is indicated to the controller 76 when the counter 61 reaches a count which is e.g. twice that of the count reached for every other header and track. This method for determining track 0 relies solely upon data read by the transducer 30, and acts as a check upon the optical track 0 detector 42.

A disk drive interface circuit 88 receives control information from the host computer or other system to which the device 10 is connected for mass data storage and retrieval, and supplies that information, including track seek data to the controller 76. Data surface and head select information is sent directly to the head select circuit 58. The controller 76 always knows where the head 30 is presently located. The controller 76 determines how far and in what direction to move the transducer 30 during track seek operations by calculating digital values which are put out in response to the actual instantaneous position of the head during the seek operation. The interface 88 communicates status information concerning the device 10 to the host, such as track 0 transducer location, data index (after the servo sector has passed by) and read/write enable following each seek to a new track.

Referring again to FIG. 1, eight bit data words put out by the controller 76 are clocked into a data latch 84 by the write enable line BAR WR of the controller 76. Each eight bit number held in the latch 84 is converted to an analog value by the digital to analog converter 86. During the track following mode, the actual value is an offset correction value stored in the controller memory position 77 for that zone and quadrant and updated every other revolution.

A two bit control line from the processor 76 is connected to the bidirectional driving amplifier 52 to provide four modes of operation of the rotor 26: slew in, slew out, coast and on-track. During maximum accelerative, decelerative and coasting phases of track seeking, the coarse servo loop is completely removed from the summing circuit 48 by the gate 55. At about sixteen tracks from the destination track, the actuator 26 is still in a decelerative or coasting mode. At that point the processor 76 begins its attempt to stop the head 30 at the destination track by following a seek profile on file in the data base. If the transducer slows down too much of if it overshoots the destination track, the processor 76 commands the actuator 26 to move on a track by track basis until the destination track is reached.

Once the destination track is reached, the gate 55 closes and the transducer 30 is servoed upon the selected phasor P to remain at that track, until some other track is commanded by the external host system.

A quadrature reliability test is made at the beginning of each seek routine by the controller 76. This test determines how much useful range is available for servoing for the departure track. If the servo has moved to a location on the selected phasor which is approximately ⅜ths of the distance to the transition from the centerline, as shown by point S in Waveform A of FIG. 3, then the controller switches from the original phasors P1 and P2 to a new half-track set of phasors P1' and P2', which necessarily places the servo nearer the center of the new phasor, e.g. point S' on the phasor P1' in Waveform B of FIG. 3. This electrically generated scheme of phasors P1' and P2' enables the electro-optical sensor to function under all circumstances of offset, thermal expansion, alignment, etc.

Instead of selecting half-track offset phasors P1' and P2', the controller 76 could as well have generated phasors tailored to move the track boundary servo back to the center of the slew line. In such a situation, amplifiers 43 and 45 would be connected to receive a digital angle offset value from the microprocessor 76 and convert it into a new quadrature signal. In such an arrangement, the amplifiers 43 and 45 might be implemented as multiplying digital to analog converters, such as the series DAC 1000 made by National Semiconductor.

It will be appreciated by those skilled in the pertinent art that the generation of the half-track-offset phasors P1' and P2' enable eight tracks to be defined where once there were only four tracks, providing that the track width is halved. The present invention thereby accomplishes a doubling of track density with little additional circuitry. In the presently disclosed preferred embodiment 10, 512 tracks are provided on one surface of an eight inch rotating disk. The width of the transducer 30 is approximately 2.3 mils. Head widths of 0.9 mils are presently known and available, so the capability of appying the principles of this invention to doubling track density and therefor doubling the storage capacity of the device 10 is readily achieved.

The controller 76 provides a self diagnostics capability, and to facilitate that capability, a self latching hexadecimal data display 81 indicates one of 16 different conditions. Some of the conditions indicate problems from which the device 10 has self corrected. Others indicate non operation problems, such as disk rotation at an incorrect speed, power line failures, loss of data from sensors, etc. By providing a readout for diagnostics at the device, the user is able to communicate the indicated problem to service personnel by telephone, thereby expediting repair and/or replacement of the device 10 or defective components indicated by the readout 81.

FIG. 4 CONTROL PROGRAM FLOWCHART DESCRIPTION

Figure 4B:
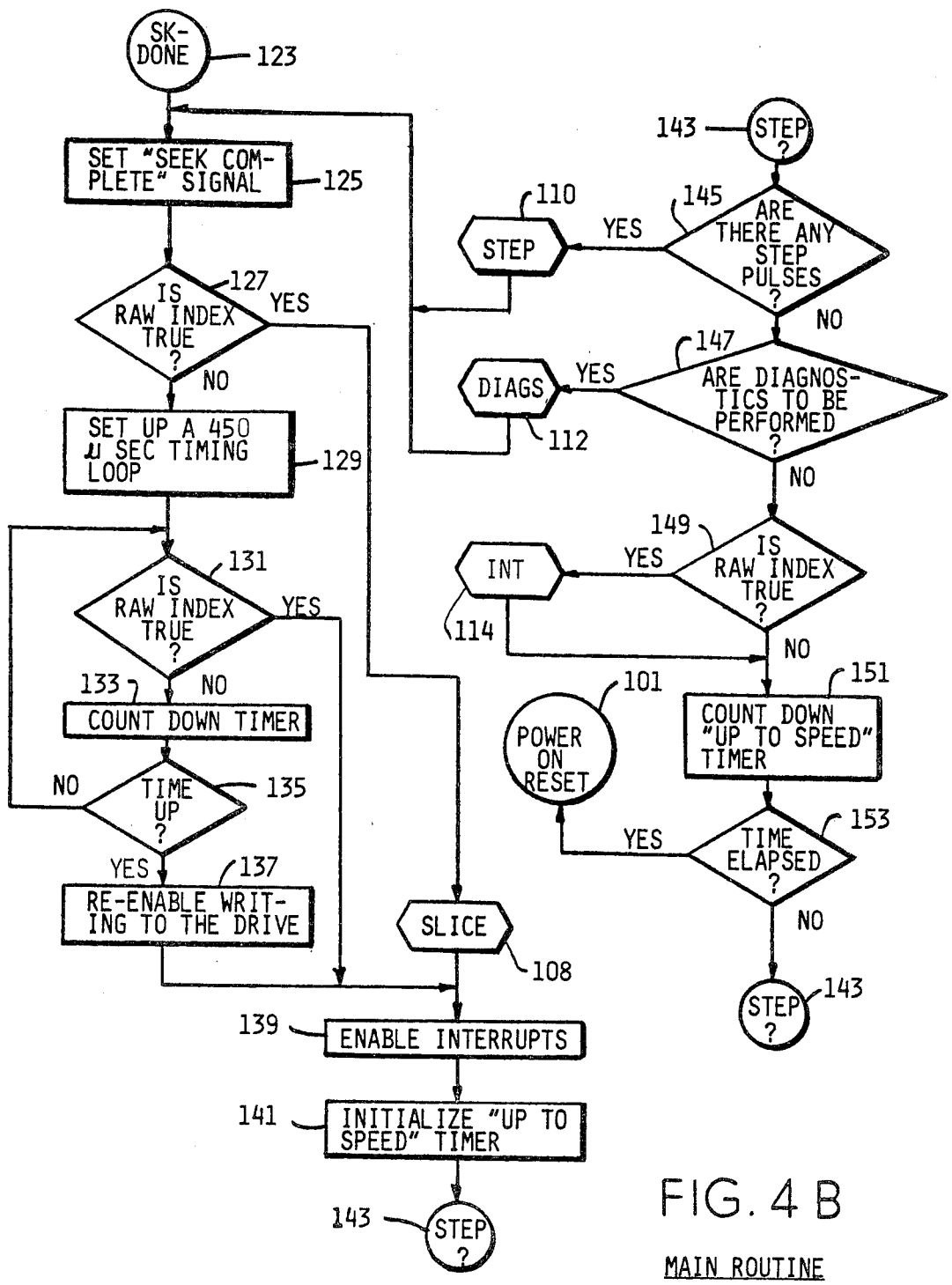

The FIG. 4 flowchart, divided into twelve separate sheets of drawing, sets forth a main program routine 100 as FIGS. 4A and 4B, including an initial "Power On Reset" portion on FIG. 4A, and a "Seek Done" and "Step?" portion on FIG. 4B. There are six major subroutines including a "Find Track 0" subroutine 104, a "Calibrate" subroutine 106, a "Slice" subroutine 108, a "Step" subroutine 110, a diagnostic "Diags" subroutine 112, and an interrupt "Int" subroutine 114. There are several other subroutines nested within these six subroutines. Each will be discussed. The order of this discussion is not to be taken as any ranking of importance of the subroutines. The control program for the processor 76 is highly interrelated and interactive. The subroutines may be rearranged and restructured without departing from the spirit and scope of this invention. Each subroutine is indicated graphically by a hexagonal block. Each functional block is represented by a rectangle. Each logical block is indicated by a diamond. Circles depict paths followed by the program from sheet to sheet of FIG. 4. Ovals represent return to the point of call of the subroutine.

MAIN ROUTINE 100

Referring now to FIG. 4A, the "Power On Reset" sequence 101 is invoked in several ways: turning on the power to the device 10, loss of the index signal 22, and receipt by the interface 88 of a reset signal from the host computer. At the next block 103 the hex display 81 is loaded with a code indicating that the rotation of the disks 14, 16 is not yet up to the correct velocity. At the logical node 105 the processor 76 determines whether the drive 10 has reached its operating velocity by measuring the time interval between index signals 22. When the measured time is within a predetermined short interval, the processor 76 knows that the disks 14, 16 have reached operating velocity of 50 Hz.

At the logical node 107 the processor 76 determines whether this stage of the main routine was reached because of a true power initialization, or whether it was reached because of a loss of the index signal 22. If the answer is no and this location has been previously reached, another error code "loss of index" is put out by a functional block 109 to the hex display 81. Otherwise, a block 111 puts out an "OK" code to the display 81.

A logical node 113 is next encountered in the main loop 100. This node 113, entitled "Is signal F1=0", tests the device 10 to determine whether it is an original model as was disclosed in the Harrison et al. patent application, supra, or whether it is a new, enhanced model as described in this application. (It is to be noted that this software will operate the drive described in that prior patent application and the drive 10 herein described with equal facility.) The F1 signal is included in the circuitry of the enhanced drive 10 but is not present in the older drives. If the test result indicates a new drive 10, a flag is set in a register of the processor 76 by a block 115. If an old drive is indicated, the flag is set accordingly by a block 117. If a new drive 10 is indicated, then the software will be able to make use of the recorded Track 0 servo reference 63, described in connection with FIG. 2. If an old drive is indicated, then the software will have to rely solely upon the optically derived Track 0 signal from the amplifier 42.

Two lines from the circuitry of the drive 10, lines M1 and M2, indicate the number of disks 14, 16 actually installed on the spindle 12. At a block 119 these M1 and M2 lines are sensed and recorded. This information is used to select the appropriate prestored velocity profile for the head carriage assembly 24. The greater number of disks, the more mass of the assembly. The selected velocity profile stored in the data base tailors the software to the mass of the assembly.

The first major subroutine encountered during passage through the main loop 100 is the Find Track 0 subroutine 104, set forth at FIGS. 4C and 4D of the drawings. When the program counter of the processor 76 encounters the Find Track 0 subroutine 104 it jumps to the microcode functionally diagrammed beginning at the top left of FIG. 4C. That subroutine 104 will be descirbed hereinafter.

After the program has returned from the subroutine 104 to the main loop 100, it encounters a logical block 121 which determines if the servoing function is enabled. In every user application it is enabled, and is only disabled for manufacturing, test and maintenance purposes, not data storage. If servoing is disabled by a jumper connection at the processor 76, then there is no need to calibrate for offset, and once track 0 has been found, the initialization portion of the main loop is finished and a "Seek Done" node 123 has been reached.

If servoing is enabled as is the usual case, the program counter jumps to the second major subroutine, "Calibrate" 106. This subroutine 106, described hereinafter, measures and calculates the offset values for each of the zones Z0-Z7 and sample quadrants (refer to discussion presented above in connection with FIG. 2) and stores these values as the 32 offset bytes in the memory locations 77 and it starts the 32 timers 79. After Calibrate 106 is complete, the processor 76 reaches the Seek Done node 123, indicating that initialization is complete. The recirculating portion of the main loop 100 is set forth on FIG. 4B, and it will now be discussed.

After the Seek Done node 123, a "Seek Complete" signal is sent to the interface 88 by a block 125. At this point interrupts should be off. The interrupt signal to the processor 76 is the raw index signal 22 by itself. At this point raw index is checked for being true at a logical block 127. If it is true, the main loop 100 then reaches the third major subroutine, the Slice routine 108. Slice 108 becomes active upon the trailing edge of the raw index pulse 22. It reads the offset bursts on the servo sector 62 and calculates the offset values, re-enables writing to the disk surface, and generates an index pulse sent to the host by the interface 88. The slice subroutine 108 is set forth on FIG. 4F and will be discussed hereinafter.

Returning to the logical block 127, if raw index is not true, a delay loop of approximately 450 microseconds is established by a functional block 129. This delay assures that the processor 76 does not issue a write enable command to the interface 88 while the head 30 is passing over the servo sector 62. The actual delay must be sufficient to cover the time required for the head 30 to pass from the end of the raw index pulse 22 to the end of the servo sector 62.

Next, a logical loop is established by a logical gate 131, a count down timer 133 and another logical gate 135. The count down timer 133 counts down the 450 microsecond delay. When the time is up, the time up logical gate 135 enables a re-enable writing to the drive 10 functional block 137. If raw index 22 ever becomes true during the timing loop, indicating arrival of the index, then the timing loop is exited at the logical gate 127. Interrupts are then enabled at a functional block 139 and the drive 10 is then able to read and write data. An up to speed timer is then initialized by a block 141 which recurrently times and monitors the rotational speed of the disks 14, 16 to be sure that velocity is sufficient to provide an air bearing effect required by the "Winchester" type heads and to be sure that data will be placed and found at the proper location on each data track. The timer is reset with each index pulse 22 and the count reached is compared with a previously stored maximum count indicative of minimum useful velocity.

The main functional portion of the operational loop 100 begins with a "Step?" node 145 which monitors the interface 88 for step commands. If any step pulses are present, the Step subroutine 110 is called. If there are no step pulses, a diagnostics check is made at a logical node 147 and the Diagnostics subroutine 112 is called if a jumper is installed on the drive 10 which indicates to the processor 76 that the self-contained diagnostics are desired by a maintenance or repair technician. Next, the processor 76 looks for raw index 22 at a node 149. Index is a recurrent interrupt and when it occurs, the Interrupt subroutine 114 is called. Otherwise, the "up to speed" timer is counted at a block 151. This is the timer that was initialized by the block 141. If the time has elapsed before index has arrived thereby indicating loss of operating velocity, the main loop 100 returns to the power on reset node 101 by operation of a logical node 153. Otherwise, the program returns to the Step? node 143 and repeats until either a step pulse is received, or an index pulse occurs. In those events the step 110 or interrupt 114 subroutines are activated. This completes the main loop 100.

FIND TRACK 0 SUBROUTINE 104

Referring to FIG. 4C, the first major subroutine 104, Find Track 0, begins with a two second delay at a block 155 to enable the head carriage assembly 24 to reach an inner crash stop. If this were an initial power on situation, the assembly 24 would already be at the inner crash stop because of a bias spring loading the assembly. This loop is called if there is a loss of index 22 or a software detected error. The block 155 turns off all power to the rotor assembly 26.

Once the inner crash stop is reached, the processor 76 senses the quadrant or phase of the optical transducer as communicated to it by the position linearity switch detector circuit 44 at a block 157. The block 157 also sends out a phase select command to the multiplexer 46 to select the sensed phase as the commanded phase. A nominal track centerline value will be sent to the DAC 86 by a block 159 which also enables power to the rotary actuator 26. A 510 track seek is then commanded by a block 161. Next, a test is made whether the track 0 optical transducer 42 must be used by a logical node 163.

If the track zero servo header burst 63 is available to the processor 76, as determined by the node 163, it becomes necessary to determine electrically the actual position of the transducer 30. To do this the processor 76 determines the relative magnitudes of the B1 and B2 (A and B) servo bursts while centered on the track optically determined by the optical transducer by a program block 187. If the servo bursts are grossly imbalanced, as determined by a node 189, then the processor 76 switches to the 45 degree offset phase at a block 191. This should place the centerline determined by the bursts B1 and B2 in or near the center of a track defined by the derived or shifted phase. Once again, the relative magnitude of the bursts B1 and B2 is determined at a block 193. Then, the transducer 30 is commanded to move outwardly eight microsteps by a block 195.

In the normal case, the B2 burst would increase and the B1 burst would decrease (on an even track). Next, the magnitude of the B1 and B2 bursts is again read at a block 197. If the bursts did not change as expected as determined by a logical block 199, this indicates that the transducer is actually located at an odd numbered track, eg. track 31 instead of track 30. The processor 76 then toggles or reverses the least significant bit of the track number in the track counter at a block 201. This effects a change from an odd track to the adjacent even numbered track, and vice versa. Now, the processor 76 knows whether the head 30 is on an odd or even track. It then performs a further measurement of the servo bursts B1 and B2 and calculates an offset value at a block 203. If the offset is large, as determined by a logical node 205, the processor 76 selects an adjacent half-track shifted phase at a block 207. At this point the Find Track 0 subroutine 104 has reached the initialize "steps to track 0" counter block 165, previously described.

When the optical track 0 test node 175 is reached, and when the servo header burst 63 for track 0 is available, the subroutine 104 then branches to another sequence found on FIG. 4D. In this sequence, the processor 76 adjusts the DAC 86 at a block 209 to center the transducer 30 as determined when the B1 and B2 bursts are equal in integrated amplitude. The preamble burst 63 is then read by the processor 76 at a block 211. If the 2F frequency is not counted by the counter 61 as determined by a node 213, then the sequence returns to the sequence beginning with block 167 and repeats. When the 2F frequency is counted, the processor 76 determines what phase was selected, and it stores that phase as a shift factor in a block 215. Optimally, the optical transducer would be aligned to sense phase 0 when the transducer is physically located precisely at track 0 as marked by the servo header burst 63. In practice this might not be the case, and the shift factor thereby compensates automatically for errors in alignment which are not unknown in the manufacturing processes. Once the shift factor is saved at the block 215, the subroutine branches to the previously described sequence beginning with the block 179 and proceeds through that sequence until the return causes the processor 76 to return to the main loop 100.

If the optical transducer 42 for track 0 must be used, the program jumps to a block 165 which initializes a "steps to track 0" counter. This counter in the processor 76 is then decremented by a block 167. If the count has elapsed, a logical node 169 goes to a block 171 which puts out an error message to the hex display 81 indicating that track 0 cannot be found. The subroutine then goes to an "Error" routine 150, described hereinafter in connection with FIG. 4F. If the count has not elapsed, then the processor 76 commands a step out one track function at a block 173. Another logical gate 175 determines whether the optical track 0 sensor 42 must be used. If so, another node 177 causes the subroutine to loop back to the block 167 until optical track 0 is reached. Then, the subroutine branches to a sequence on FIG. 4D beginning with a block 179 which sets the 32 offset bytes in the memory 77 to a nominal value, e.g. 96. The 32 timer registers 79 are cleared by a block 181. The track (cylinder) address register is set to zero at a block 183, and a track 0 signal is sent to the interface at a block 185. The Find Track 0 subroutine 104 then returns to the main loop 100. This completes the description of the Find Track 0 subroutine 104.

CALIBRATE SUBROUTINE 106

Referring to FIG. 4E, the Calibrate subroutine 106 begins with a block 217 which determines a digital value to be sent to the DAC 86 which will make the B1 and B2 bursts equal in peak amplitude. In accomplishing this function, the processor 76 takes four readings of the servo sector bursts and averages them, and then takes four more readings and averages them to see if there is any difference. This process is continued until the difference goes to zero. At that point the transducer 30 is aligned with track centerline. The derived offset value is then saved in the appropriate one of the offset registers 77 by a block 219. A one track inward step is performed at the block 221. The next phase of the zone is then reached and the above process is repeated because of a logical block 223. Once the four phases (first four adjacent tracks) of the zone are completed, the node 223 is passed. A next logical node 225 tests whether all eight zones and phases are provided with calculated offset values. If not, the next zone is sought by a block 227 and the above process is repeated for that zone and all remaining zones, until the node 225 becomes true. Servoing is then enabled by a block 229, and the head 30 is commanded to seek back to track 0 by a block 231. A ready flag is sent to the host via the interface 88 by a block 233, and the processor 76 is returned to the main loop 100 by a return node 235. The end of the Calibrate subroutine 106 has been reached.

DIAGNOSTICS SUBROUTINE 112

The Diagnostics subroutine 112, set forth on FIG. 4E, implements the self-diagnostics capability of the device 10. Diagnostics 112 begins with a logical node 459 testing the position of the transducer 30. If it is at track 0, then a target track register is incremented by one at a block 463. This begins a test pattern which causes the head 30 to perform seeks of every possible length, from one track to 511 tracks, and every track distance in between. A logical node 465 determines whether the target track counter has reached 512. If it has then the target track counter is reset to 1 by a block 467 and the test pattern is automatically repeated. A block 469 causes the head 30 to seek to the track specified by the target track counter.

In the event that the head 30 was not at track 0 when the Diagnostics subroutine 112 was first called, a block 461 causes the head to move to track 0. Seek complete is sent to enable troubleshooting, and interrupts enabled flags are set by a block 471 to enable updating of the offset registers should index occur during the 5 millisecond window. A check is made on the availability of servo header track 0 burst 63 by a logical node 473. If so, meaning that the drive 10 includes the track zero header burst 63, it is checked at a block 475 to be sure that the head is at track 0. If the drive 10 excludes the burst 63, then the block 475 is omitted. If there has been a seek error, that it, either the optical transducer 42 or the header burst 63 has not indicated track 0, then the Error code 150, set forth on FIG. 4F and described hereinafter, is invoked. If there has been no seek error, then a 5 millisecond delay is generated by a block 479 which provides an interrupt window for the index pulse 22. If the diagnostics jumper on the drive 10 is still connected, as determined by the node 481, the Diagnostics subroutine 112 is repeated. Once the jumper is removed, a block 483 sends an "OK" code to the hex display 81 and the processor 76 encounters a return node 485 which returns it to the main loop 100.

ERROR ROUTINE 150

The Error routine 150, set forth on FIG. 4F, has several purposes. One is to display an error code via the hex display 81. Another is to drop power to the head carriage actuator 26 and cause the head carriage assembly 24 to return to the inner crash stop. The first task of the Error routine 150 is to display the error code at the hex display 81 which caused the processor 76 to reach this location in the program. This is achieved by a block 487. The presence of a jumper F2 is tested by a logical node 489. The F2 jumper enables the use of a diagnostics circuit board which includes eight switches and two additional hex displays. By setting the switches, a maintenance technician may then read the contents of all of the registers of the processor 76. If the F2 jumper is installed, a functional block 491 reads the switches on the diagnostics board and displays the contents of the selected register.

If the F2 jumper is not installed, power to the rotor 26 is turned off by a block 493 which returns the carriage assembly 24 to the inner crash stop. If the diagnostics jumper is connected, a node 479 causes a loop which causes the error code to remain displayed at the hex display 81. When the jumper is removed, a block 499 puts out the "OK" code to the hex display 81. The Find Track 0 subroutine 104 is then called. If the diagnostics jumper is not in, as tested by a node 495, then the display loop is avoided in order to preserve the error code at the display 81, and the Error routine 150 calls the Find Track O subroutine 104 just as soon as power is removed from the rotor 26 by the block 493.

Upon completion of the Find Track 0 routine 104, the Error routine 150 is reentered at a block 501 which sets all of the zone timers 79 to the timed-out state. This means that any seek to a new phase or zone will result in a call to the Interrupt subroutine 114 which will update the offset value. The Error routine 150 finally goes to the seek done node 123 of the main loop 100.

STEP SUBROUTINE 110

The Step subroutine 110, set forth on FIG. 4G, reads step pulses from the host via the interface 88, waits until all of them have come in, counts them, and then issues a seek to the actuator via the Seek subroutine 300, described hereinafter in connection with FIGS. 4H and 4I. The Step routine 110 is included to enable the device 10 to emulate a stepper-motor driven storage device such as a floppy disk or a stepper motor driven hard disk, such as the model SA 1000 made by Shugart Associates.

Stepper motor driven devices, such as the SA 1000, are designed to operate in two different modes. In one mode, the floppy interface mode, the drive expects to receive a step pulse every one and one half millisecond continually. It would then step one track with each step pulse. The burst mode of operation of the e.g. SA 1000 is one in which stepping pulses are sent out much faster than once per one and a half millisecond. In that mode the pulses might range from one microsecond to 600 microseconds. As long as these pulses come in, they are stored up in a counter. After the last pulse the total number of pulses indicates the length of the seek. Both modes may be emulated and utilized by the device 10 of the present invention.

The interface 88 includes a 600 microsecond one shot which is fired by each step pulse. As long as that one shot is still firing, a logical node 263 loops. When the one shot stops firing, a block 265 reads the direction line to sense the direction of seek. The number of steps accumulated in the processor 76 during the loop provided by the node 263 is read at a block 267. The one shot is then checked to see if it is firing again at a node 269. At this point the one shot should not be firing. If it is, the routine loops back to the first node 263. If it is not, then a node 271 checks to see if the number of steps is 0. It would not be so on the first pass through this routine, but it could be 1. In that case a logical gate 273 causes a single step mode block 275 to set a flag which says that the host may be operating in the one and a half millisecond per pulse floppy mode. If more than one step pulse is present, the flag is not set by the node 275. Next, the steps counter is cleared at a block 277 so that it will be ready to accrue step pulses for the next seek.

Once again, a check is made to see if the one shot is firing by a node 279. If so, it means that the host has sent a step pulse which has been missed by the processor 76 because it occurred during the clear the steps counter pulse. The situation is remedied by again clearing the step counter and by incrementing by one the number of steps to go at a block 281. A go-seek node 283 is then reached in the Step subroutine 110.

At the beginning of the Go-seek sequence, a logical node 285 tests for a microstep signal, i.e. that functional capability previously discussed in connection with the move out 8 microsteps block 193 of the Find Track 0 subroutine 114. Normally, that signal will be false, which will result in a call to the Seek subroutine 300, to be discussed hereinafter in connection with FIGS. 4H and 4I. After the seek is performed, the processor 76 returns to a logical node 299 at which the single step mode flag is tested. If it is not set, the single step mode flag is cleared at the block 293 and the processor 76 is returned to the main program loop 100 at a return node 295. If the single step flag is set, then the processor 76 returns to the beginning of the Step subroutine 110.

It will be appreciated that the step subroutine 110 functions to keep track of step pulses sent to the interface 88. For example, on the first pass through the loop, the number of steps counted at the block 267 will equal 1. A call is made to the Seek subroutine 300 for a 1 track seek. By the time the program has come back to the block 267, e.g. 30 more single step pulses may have been accumulated and counted at the block 267. The Seek subroutine 300 is called again and a 30 track seek is performed. When the program returns, 43 more step pulses have been received, and the head is commanded to seek out 43 more tracks. In this way the drive 10 "hopscotches" across its range of useful tracks, which is more efficient than waiting until all of the single step pulses have been received, and which is practically dictated, since the total number of step pulses is unknown when they first begin to arrive.

The Step routine 110 accomodates incremental offsets from the centerline of each track by operation of a microstep signal. If the microstep signal is true, as tested by a node 285, then the processor 76 adds the number of additional microsteps to the current number of microsteps at a block 287. Each offset normally gets zeroed at the beginning of a seek. If the offset is zero, which is the normal operating situation, the head is located at the track centerline. If, e.g., eight microsteps out are commanded, the number 8 is added at the block 287, and a new digital value is put out to the DAC 86. A five millisecond delay is then called at a block 291 to enable the drive 10 to perform the offset. Then, the program control is returned to the "clear single step mode" flag block 293.

During operations of the foregoing sequence, the device 10 is not servoing on the bursts B1 and B2. One use for this sequence is to force the head 30 off of track centerline to enable measurement of its performance in controlled marginal operating situations to determine data transfer reliability ranges. This sequence is also useful in the manufacturing process and for testing and maintenance.

WSSTEP SUBROUTINE 400

Referring back to FIG. 4F, there is a very short subroutine labelled "WSStep" 400 which is an acronym for "wait for a single step." Its function is to detect a phase change. A 15 millisecond timing loop it set up by a block 405. A phase change is then determined by a logical node 407. If the phase has changed, this subroutine ends at a return node 409. If it has not changed, then the timing loop is considered at a node 411. If the time elapses without a phase change occurring, then the Error routine 150 is invoked. If the time has not elapsed, the sequence loops back to the node 40.

The processor 76 toggles between the sensed phasors and the derived phasors by switching between two adjacent input/output ports by toggling the least significant bit of the port address. On the same bit position of the input bytes the processor receives the processed quadrature signals. If the processor is reading e.g. from port 0, it will receive the two signals for the unshifted phases, and if it is toggled to port 1, it will be reading the two signals from the shifted phases. In the WSStep subroutine 400, the processor 76 is reading from one of the two ports, waiting for a data (phase) change. If the next time that the WSStep subroutine 400 is called, the processor has not changed to the other port, then it will read in the 90 degree phase shift, indicative of a full track width. This is the mode of operation in the slew (accelerate, decelerate) mode. When 16 tracks to go is reached in a seek, and when the processor 76 detects a phase change in the WSStep subroutine, the processor toggles to the other port, and reads the shifted, half track phase. This half track phase shift detection is performed by WSStep in the CVEL routine 350 as well. In this way WSStep increases its accuracy in detecting phase changes (track boundaries) to half steps during the last, slow-down portion of slew mode seeks, and also during the constant velocity mode.

This subroutine 400 acts as a backup to the transducer. For example, if the head carriage assembly 24 were resting against the crash stop, there would never be a phase change, so this routine 400 enables entry to the Error routine 150 so that the problem can be indicated to the operator. Otherwise, the processor 76 might just sit in the seek mode or in some other mode without being aware that a difficulty had arisen.

SEEK SUBROUTINE 300

The Seek subroutine 300, depicted on FIGS. 4H and 4I, actually commands the transducer 30 to move from track to track in the seek mode for the device 10. This subroutine is called in three different places: in the Step subroutine 110, in the Diagnostics subroutine 112, and in the Calibrate subroutine 106 in the power on reset portion of the main loop 100. The "seek complete" flag to the interface is made not true by a block 301 since the seek is not complete at the beginning of this subroutine.

Next, the microstep offset value sent to the DAC 86 in the Step subroutine 110 (at block 287) is cleared by a block 303. A check is made to see if the head 30 is at track 0 at a node 305. If it is, a further node checks to see if an outward direction seek is being commanded. If so, any seek would be beyond the range of tracks, so a return is made by a block 309 which thereby signals a "seek complete" to the interface 88. If not, a target track is computed from three values by a block 311: present track position, the number of steps, and the direction, whether in or out, to the destination track. If the calculation results in a negative number, as tested by a node 313, the target track is set at track 0 and the number of steps is adjusted to end up at track 0 by a block 315.

If the drive 10 is an early model without the sector header burst for track 0, this is tested at a node 317. If it is not, a test for phase shift is made at a block 319. If the offset value is more than 24 bits from nominal value, a 45 degree shift is performed. (24 bits is about three fourths of a track width). This location, at the beginning of a seek, is the only time that phase shifting occurs, so that there is no perturbation or transducer position disturbance during read or write data operations of the device 10. The target track phase is calculated from the destination track and the shift factor at a block 321 which then controls the phase P select at the multiplexer 46. The index counter is incremented by one at a block 323 because during seek, the processor 76 is simply too busy to read the index pulse 22. A logical node 325 checks to see if the "single step mode" flag is set. If it is, then the carriage assembly 24 may only move at constant velocity, because at each track a test must be made to see if it is track O. In that event the constant velocity "CVEL" routine 350 is invoked. That routine appears on FIG. 4J and is discussed hereinafter.

A logical node 329 then checks to see if the number of steps of the seek is less than or equal to ten. If so, the CVEL routine 350 is called. If not, the number of steps is divided in half by a block 331. This figure is the number of steps to be taken during acceleration mode and the number of steps to be taken during deceleration mode. The index counter is again incremented by one at a block 333 in an effort to emulate true index during the longer seeks, e.g. 40 millisecond seeks. A table lookup occurs at a block 335 to determine the value of maximum velocity permitted for the particular seek length commanded. Next, the processor 76 commands the driving amplifier 52 to accelerate the head carriage 24 in the appropriate direction because of a block 337, and the head carriage then begins to move.

The WSStep subroutine 400 (FIG. 4F) is then called to monitor a phase change. A logical node 341 determines if the maximum velocity for the seek has been exceeded. If it has, a coast mode is called by a block 343. If not, then the accelerate mode is continued at a block 345. Next, quadrature is checked to determine if the carriage 24 is moving in the right direction by a node 347. If not, then a jump is made to a sequence labelled ACCTRN 349 (FIG. 4I). A warning code is put out to the hex display 81 by a block 351, and the number of steps in the accelerate-coast-decelerate mode (called the "slew" mode) is converted to constant velocity mode steps by a block 353. The CVEL routine 350 is then invoked.

Returning to FIG. 4H, a logical node 355 determines if the number of acceleration steps have been passed. If not, a loop back to WSStep 400 is made and the sequence is repeated until half the distance to the destination track has passed by. Then, a logical node 357 (on FIG. 4I) tests whether there are less than 17 tracks to decelerate. If so, then a deceleration subsequence DEC3 377 is invoked. If not, the deceleration sequence DECEL 359 is invoked. The switch point at 16 tracks is made because at that point the carriage 24 has slowed down enough so that half track phase change detection is then practical, and yields higher resolution and accuracy.

In the main deceleration loop 359, a timing loop is set up by a block 361 and a phase change is looked for by a node 363. If the timing loop times out, as detected at a node 365, a recovery is attempted by a branch to the ACCTRN sequence 349 followed by a jump to the constant velocity CVEL routine 350. If a phase change is timely detected by the node 363, a test is made by a node 367 to see if the head velocity is too fast for this location in the seek, i.e. is the carriage 24 at, above or below the prestored digital trajectory data value in a profile for this seek. If it is going too fast, a deceleration is called by a block 369, which reverses current in the rotor 26. If the carriage is at or below profile velocity, a coast is called by a block 371. Another test is made by a node 373 to see if the carriage 24 is moving in the right direction. If not, another jump is made to the ACCTRN sequence 349. If so, then the number of deceleration steps to go is counted by a block 375. If the 16th track out is reached, the node 357 goes to the DEC3 routine 377.

Referring to FIG. 4J, the DEC3 routine 377 begins by setting up a timing loop at a block 379. A 45 degree phase change is monitored by a node 381. If the phase change is not detected, another node 383 sees whether the timing loop has timed out. If so, a jump is made to the constant velocity CVEL routine 350. This is done because the head 30 is moving much slower than the velocity profile and there is a danger that the head 30 will turn around short of and go away from the destination track. If not, a loop back to the node 381 is made. When the 45 degree phase change is timely detected by the node 381, a further node 385 checks to see if the actual velocity is in excess of profile velocity. If so, a deceleration is commanded by a block 387. If not, coasting is commanded by a block 389. Another test of correct direction is made by the node 391. A half track position location is tested by a node 393. If so, track counting at a block 395 is bypassed as only full tracks are to be counted. A node 397 tests whether the head is at the target track. If not, a loop back to the beginning block 379 is made. If so, the slew mode is exited at a block 399, and a jump is made to the constant velocity CVEL routine 350.

CONSTANT VELOCITY CVEL ROUTINE 350

The first task of the Constant Velocity routine 350 is to calculate and put out a digital value to the DAC 86 to cause the carriage 24 to accelerate towards the target track. This task is performed at a block 410. It should be noted that the value put out will take into account the actual position of the head 30. If the target track has been reached, and the head 30 is moving past the track, a reverse acceleration value will be calculated. If the track is yet to be reached then a forward acceleration value will be put out. The block 401 enables the device 10 to accomodate overshooting of the target or destination track by the head 30, with little compromise of access time in event of overshoot, and with significant improvement of average access time.

A call is then made to the wait for single step subroutine (WSStep 400) to detect a phase change which is a high resolution measure of head carriage velocity. After a track crossing is detected, a block 413 decrements the number of tracks to go in the destination track register of the processor 76. A node 415 checks to see that the head 30 is moving toward the target track. If not, a loop back to the beginning is made. If so, a block 417 puts out a digital value to the DAC 86 to cause the head 30 to decelerate as the target track approaches. The block 417 works in opposition to the block 401. If the carriage velocity is very high, then the deceleration value put out by the block 417 will dominate over the acceleration value put out by the block 401. However, if the carriage is moving very slowly, then the acceleration value will dominate the deceleration value.

A 600 microsecond timing loop is set up by a block 419. A phase change is monitored by a node 421. If there is a phase change, it means that the head 30 is moving too fast, and a loop back to the block 413 is made to increase deceleration. If not, a time out node 423 monitors the timing loop. If the time elapses, a node 425 determines whether the head is at the destination or target track. If not, a return is made to the beginning of the Constant Velocity routine 350. If so, a Target routine 450 is entered.

TARGET TRACK ROUTINE 450

Referring now to FIG. 4K, the Target Track routine 450 begins with a block 429 which switches the processor 76 from the constant velocity mode into the track following mode. A node 431 checks to see whether servoing is disabled. If so, then a nominal 60H track centerline value is put out to the DAC 86 by a block 433. If not, a node 435 checks whether the five minute timer 79 for the zone and phase of the target track has elapsed. If so, a block 439 waits for the index 22 and then reads the bursts B1 and B2 and computes the offset value needed to correct for any offset. Otherwise, the offset vaue for this zone and phase stored in the memory 77 is obtained by a block 437. The offset value from the appropriate one of the blocks 433, 437 and 439 is then sent to the DAC 86 by a block 441. A period of ten milliseconds is provided for settling by a block 443. Track overshoot is checked by a node 445. If overshoot occurred, the constant velocity routine 350 is entered. Otherwise, a node 447 checks whether the servo sector burst 63 for track 0 is available. If it is not, a block 449 checks the track 0 flag and compares it to the track address register of the processor 76. If they agree, the destination track has been reached and a return to the main loop 100 is made by a return 451. If they don't agree, an error code is sent to the hex display 81.

If the burst 63 is available, a node 453 checks to see if the track address register (CAR) is equal to 0. If it is, a node 455 checks whether the processor 76 is in the single step mode. This check is made to save time. In virtually every case, there will not be a seek error when a seek is made to track 0, and there is little to be gained by waiting until the index pulse 22 is read and the header 63 is then read. Thus, except in the single step mode, the processor 76 does not wait for index, but returns at this point to the main loop 100.

In the single step mode, it is necessary to verify arrival of true track 0, and a block 457 does just that by waiting for index and then reading the burst 63. The single step mode is the method that the host computer uses to recalibrate the device 10. Hence, the necessity of the block 457. This completes the discussion of the subroutines concerned with seeking.

INTERRUPT SUBROUTINE 114

Referring now to FIG. 4L, the Interrupt subroutine 114 begins with an index pulse 22 which in the presently preferred embodiment acts as an interrupt signal to the processor 76. The device 10 calculates the servo offset from the bursts B1 and B2 every other revolution. On the first revolution the bursts are sequentially read, and an offset value is calculated. At the beginning of the next revolution as determined by arrival of the index pulse 22, the value is sent to the DAC 86 and the head 30 is moved during passage over the servo sector 62. This minimizes head movement except during servo sector intervals and maximizes head position stability during read and write portions of the revolution of the disks 14, 16. The Interrupt subroutine 114 is called only when interrupt is enabled: which is when the processor 76 is in the main loop 100 or during specific times during the Calibrate subroutine 106, or whenever a five minute timeout occurs, and the zone and phase offset value stored in the memory 77 must be updated.

The Interrupt subroutine 114 begins with a node 503 which determines whether offset should be computed on that particular revolution. If not, that means that it was computed on the last revolution, and the new offset value is put out to the DAC 86 by a block 505. If so, then a node 507 tests whether the track header burst H is available. If so, a block 509 reads the header preamble H for the particular track, which determines whether the track is track 0 or one of the other 511 tracks by counting the number of pulses in the header. The Slice subroutine 108, to be described hereinafter in connection with FIG. 4F, is then called. Upon return, a node 511 checks for step pulses. If so, a branch to a node 513 is made in order to abort servoing, since single stepping to the next track overrides servoing on the present track. A node 515 checks whether servoing is enabled by placement of the servo enabled jumper. If not, there is no need to go farther. A node 517 determines whether offset is to be computed on this particular revolution. A node 519 checks whether the processor 76 is in the microstep mode. A node 521 checks the sum of peak amplitude of the bursts B1 and B2. If the magnitude is too small, the Error routine 150 is invoked.

A block 523 computes the change in offset value (delta) to be applied to the DAC 86. A block 525 zeros the timer 79 for the zone and phase of this track. A block 527 computes the new offset value from the old offset value and the delta value and stores it away so it may be put out to the DAC 86 at index of the next revolution. A block 529 increments the index counter by one. The index counter serves as the low order bit portion of the timers 79 for each zone and phase. A block 531 toggles the compute/perform offset flag which alternates with each revolution. A block 533 initializes the "up to speed" tachometer, and a return to the main loop 101 is then made at the node 535. This completes the description of the software stored in the factory programmable read only memory of the monolithic microprocessor controller 76.

SLICE SUBROUTINE 108

The Slice subroutine 108 is set out on FIG. 4F. It functions to control the fast analog to digital converter 74 and the peak detector 66. It starts at a node 251 which determines if raw index 22 is true. If it is, a loop is entered. When the raw index pulse 22 is no longer true, meaning that the servo sector 62 has been reached by the transducer 30, a block 253 delays for 32.5 microseconds, and then calls for an analog to digital conversion of the measured peak for the first read burst, B1 or B2, depending upon whether it is an odd or even track. A block 255 performs a 65 microsecond delay and then converts the second read burst amplitude peak to a digital value at the converter 74. A further delay of 57.5 microseconds is performed by a block 257. This delay assures that the transducer is past the servo sector. Writing to the disk surface is then enabled at the interface 88 by the block 257. A functional block 259 causes a further 50 microsecond delay and follows the delay with a user "index" pulse sent to the host via the interface 88. Then, a return node 261 returns the processor 76 to the program location where the Slice subroutine 108 was called.

Here follows a list in hexadecimal code of the program and data base which is stored in the program memory of the processor 76. The leftmost four digits are the address locations for the program.

| | | | | | | | | | | | | | | | | |
|---|---|---|---|---|---|---|---|---|---|---|---|---|---|---|---|---|
| 0000: | 04 | 30 | 00 | 24 | 00 | 28 | 43 | 29 | 51 | 4E | 54 | 4D | 38 | 31 | 09 | 03 |
| 0010: | 81 | 74 | F4 | 27 | D7 | 74 | E3 | 14 | E5 | B9 | FD | 81 | D2 | 26 | 81 | 37 |
| 0020: | D2 | 1E | B9 | 0D | 74 | F4 | 94 | 00 | B9 | 40 | 23 | 40 | 34 | D9 | 04 | A6 |
| 0030: | 14 | E5 | B8 | 8D | 90 | 86 | 39 | 04 | 35 | 86 | 39 | BE | 0F | BF | 20 | 86 |
| 0040: | 47 | EF | 3F | EE | 3F | 04 | 35 | B9 | 0D | B8 | 7C | F0 | D3 | 55 | 96 | 52 |
| 0050: | B9 | DD | B0 | 55 | 74 | F4 | 74 | E3 | B9 | 7D | B1 | FF | B8 | FD | 80 | 37 |
| 0060: | 12 | 63 | 11 | 80 | 47 | 53 | 03 | E7 | AA | BF | 02 | B9 | 7E | FA | E3 | A1 |
| 0070: | 1A | 19 | EF | 6D | 94 | 00 | B8 | FD | 80 | 37 | F2 | A6 | 54 | 00 | B8 | 20 |
| 0080: | 85 | 54 | A6 | BA | 00 | BB | 01 | B4 | AF | 18 | F8 | 53 | 03 | 96 | 81 | F8 |
| 0090: | D3 | 40 | C6 | 9C | BA | 00 | BB | 3C | B4 | AF | 04 | 81 | 95 | B9 | 6A | 11 |
| 00A0: | BA | 01 | BB | C4 | B4 | AF | B9 | 6A | 11 | F4 | E9 | 9A | FE | 9A | FB | 86 |
| 00B0: | BD | BF | 4F | 86 | BF | EF | B3 | 9A | BF | 8A | 40 | 04 | BF | 34 | 98 | 05 |
| 00C0: | B8 | 76 | B0 | 01 | B4 | 9C | 96 | E0 | B8 | FD | 80 | 37 | D2 | DC | 74 | E3 |
| 00D0: | BF | 04 | EF | D2 | B8 | 76 | 10 | F0 | 96 | C4 | 04 | 30 | 94 | 99 | 04 | AD |
| 00E0: | 15 | B4 | 5B | 04 | AD | 15 | 23 | 18 | 39 | 8A | 6E | 9A | 6F | 27 | 62 | 83 |
| 00F0: | A5 | B9 | 68 | B1 | 00 | 86 | F5 | 05 | 76 | FC | 04 | F8 | 15 | 83' | 00 | 00 |
| 0100: | D5 | B8 | 69 | A0 | B8 | 68 | F0 | 12 | 1D | 54 | 4C | C6 | 1F | BF | 0F | B8 |
| 0110: | FC | 9A | 7F | 8A | 80 | EF | 15 | 80 | 37 | 74 | AA | 24 | 1F | 34 | E0 | 34 |
| 0120: | 98 | 96 | 78 | B8 | FD | 80 | F7 | E6 | 78 | B8 | 68 | F0 | 12 | 78 | B8 | 74 |
| 0130: | F0 | 96 | 78 | FD | 6C | 67 | 37 | 17 | AE | 03 | 20 | F6 | 89 | B8 | 61 | F0 |
| 0140: | 12 | 45 | FD | 24 | 46 | FC | 47 | E7 | AD | 53 | E0 | 2D | DD | AC | BF | FF |
| 0150: | B4 | 9C | 96 | 78 | 1F | FE | 6D | AD | F6 | 50 | CC | FC | 17 | 96 | 50 | FF |
| 0160: | 03 | E0 | B8 | 63 | A0 | 54 | 0D | 03 | 40 | A8 | B0 | 00 | B8 | 6A | F0 | C6 |
| 0170: | 78 | 54 | 0D | 03 | 20 | A8 | 34 | EC | A5 | B5 | 54 | 1D | 9A | 7F | B8 | 68 |
| 0180: | 10 | B8 | 69 | F0 | B8 | 76 | B0 | 01 | 93 | B9 | 9D | 74 | F4 | B9 | 08 | B1 |

-continued

| | | | | | | | | | | | | | | | |
|---|---|---|---|---|---|---|---|---|---|---|---|---|---|---|---|
| 0190: | 13 | 19 | B1 | 00 | 23 | 01 | D7 | 93 | 9A | 7F | 86 | 9A | B8 | FB | B9 | FC |
| 01A0: | BF | 07 | EF | A2 | 34 | CA | AC | 81 | D2 | C9 | BF | 10 | EF | AC | 34 | CA |
| 01B0: | AD | 81 | D2 | C9 | BF | 0E | EF | B6 | 9A | BF | 8A | 40 | BF | 11 | EF | BE |
| 01C0: | 9A | FD | BF | 03 | EF | C4 | 8A | 02 | 27 | 83 | 8A | 80 | BF | 05 | EF | CE |
| 01D0: | 90 | BF | 24 | EF | D3 | 80 | 9A | 7F | 83 | BF | 20 | A1 | 19 | EF | DB | 83 |
| 01E0: | B9 | 64 | F1 | B9 | 74 | 61 | B9 | FE | 91 | 83 | B8 | 73 | B9 | 63 | F1 | B9 |
| 01F0: | 64 | 61 | A1 | A0 | 83 | BE | 05 | 74 | DB | 14 | F0 | 34 | EA | 34 | E0 | 83 |
| 0200: | B9 | FE | 23 | 60 | 91 | B9 | 64 | A1 | BE | 05 | 74 | DB | 83 | B9 | 61 | F1 |
| 0210: | 53 | 03 | AF | F1 | 53 | C0 | 19 | 41 | 47 | 4F | 53 | 1F | 83 | B9 | 72 | 11 |
| 0220: | F1 | 96 | 2E | B9 | 40 | BF | 20 | F1 | D2 | 2B | 11 | 19 | EF | 27 | 83 | 09 |
| 0230: | 37 | 17 | B9 | 60 | 61 | 53 | 07 | 96 | 3E | B9 | FC | B9 | E7 | 83 | 23 | 10 |
| 0240: | 83 | B9 | FD | 81 | F2 | 48 | 27 | 83 | B9 | 7D | F1 | 83 | 54 | 41 | C6 | 46 |
| 0250: | B9 | 6A | F1 | C6 | 62 | B9 | 60 | F1 | C6 | 46 | 07 | C6 | 46 | 17 | 17 | 53 |
| 0260: | 07 | 83 | 37 | 83 | 23 | FF | 6B | AB | 23 | FF | 7A | AA | 83 | 23 | 01 | 6B |
| 0270: | AB | 27 | 44 | 6A | B9 | FD | 81 | 37 | F2 | 99 | B9 | F1 | C6 | 99 | 54 |
| 0280: | 0D | 03 | 40 | A9 | F1 | 37 | D2 | 91 | F4 | A5 | F6 | A0 | 14 | F0 | 27 | AA |
| 0290: | AB | 54 | 0D | 03 | 20 | A9 | F1 | 44 | 9B | 23 | 60 | B9 | 64 | A1 | E4 | 76 |
| 02A0: | E4 | 32 | 34 | EC | 34 | E0 | BF | 04 | 27 | AA | 14 | F0 | B9 | 63 | F1 | 6A |
| 02B0: | EF | A9 | 77 | 77 | B2 | BB | 53 | 3F | A1 | 44 | BF | 43 | C0 | A1 | 37 | 96 |
| 02C0: | A2 | 83 | BF | 8C | 23 | B4 | B9 | 64 | 61 | E6 | D3 | FF | 61 | E6 | F0 | 23 |
| 02D0: | FF | 44 | D5 | 23 | 01 | AF | B9 | 60 | 61 | 53 | 07 | A1 | 09 | 6F | 53 | 07 |
| 02E0: | 43 | 18 | 39 | 54 | 00 | B9 | 40 | 23 | 40 | 34 | D9 | B9 | 7D | 74 | F4 | 83 |
| 02F0: | 94 | E5 | C6 | EF | 80 | 03 | 02 | D1 | 53 | 06 | C6 | CF | 44 | D3 | 80 | 00 |
| 0300: | 08 | D0 | 35 | D5 | 5E | DA | 85 | DF | FF | 72 | 57 | 4A | 41 | 3B | 36 | 32 |
| 0310: | 2F | 2D | 2A | 28 | 27 | 25 | 24 | 23 | 01 | 16 | 43 | 63 | 7C | 8F | 9F | AB |
| 0320: | B5 | BE | C5 | CB | D0 | D5 | D9 | DC | DF | E1 | E3 | E5 | E7 | E9 | EA | EC |
| 0330: | ED | EE | EF | F0 | F1 | F6 | 66 | 4E | 42 | 3A | 34 | 30 | 2D | 2A | 28 | 26 |
| 0340: | 24 | 23 | 21 | 20 | 1F | 13 | 45 | 68 | 82 | 96 | A6 | B2 | BC | C4 | CB | D1 |
| 0350: | D6 | DA | DD | E0 | E3 | E5 | E7 | E9 | EB | EC | ED | EF | F0 | F1 | E0 | 5D |
| 0360: | 47 | 3C | 35 | 30 | 2C | 29 | 26 | 24 | 23 | 21 | 20 | 1E | 1D | 1C | 3B | 64 |
| 0370: | 81 | 97 | A8 | B5 | BF | C7 | CE | D4 | D8 | DC | E0 | E3 | E5 | E7 | E9 | EB |
| 0380: | ED | EE | EF | F0 | F1 | D0 | 56 | 42 | 38 | 31 | 2C | 29 | 26 | 24 | 22 | 20 |
| 0390: | 1F | 1D | 1C | 1B | 1A | 57 | 7A | 93 | A6 | B4 | BF | C8 | CF | D5 | DA | DE |
| 03A0: | E1 | E4 | E7 | E9 | EB | ED | EE | EF | F0 | F1 | B8 | 6B | A0 | B9 | 6A | F1 |
| 03B0: | C6 | CA | B9 | 6F | B1 | 00 | F0 | B8 | 61 | 92 | CB | 8A | 10 | 27 | 20 | 18 |
| 03C0: | 40 | B0 | 00 | C6 | CA | 11 | B9 | 1D | 74 | F4 | 83 | 9A | EF | F0 | 18 | 40 |
| 03D0: | 96 | CA | C8 | B0 | 04 | B9 | 2D | 74 | F4 | 24 | 8D | BF | E9 | 00 | EF | DD |
| 03E0: | EE | DB | 83 | B8 | FD | 80 | 72 | E2 | B8 | F7 | 80 | A8 | B9 | 77 | F1 | A9 |
| 03F0: | F0 | 91 | 64 | E3 | 91 | F9 | B9 | 77 | A1 | 83 | 00 | 00 | 00 | 00 | 00 | 00 |
| 0400: | B9 | 5C | 27 | 34 | D9 | BD | 08 | AE | 74 | DB | ED | 07 | B8 | FC | 80 | 53 |
| 0410: | 06 | 43 | 18 | 39 | 77 | B8 | 61 | A0 | 18 | B0 | 04 | 54 | 00 | 9A | DF | B9 |
| 0420: | 6B | B1 | 10 | BA | 01 | BB | FE | 85 | 95 | B4 | AF | 54 | 4C | C6 | 61 | 14 |
| 0430: | F0 | 34 | EA | 54 | C2 | 14 | F0 | B9 | 63 | F1 | AD | B9 | 64 | B1 | 68 | 34 |
| 0440: | E0 | 14 | F0 | B9 | 63 | FD | 37 | 17 | 61 | F2 | 59 | B8 | 61 | 10 | C8 | F0 |
| 0450: | 03 | 06 | 53 | 07 | A0 | B9 | 7D | 74 | F4 | 54 | 00 | 34 | F5 | 34 | F5 | 54 |
| 0460: | C2 | BD | 30 | ED | 69 | B9 | CD | 04 | 11 | BA | 00 | BB | 01 | B4 | AF | 54 |
| 0470: | 41 | 96 | 79 | 54 | 2F | 92 | 63 | 84 | 88 | 34 | F5 | 14 | F0 | B8 | 6B | F0 |
| 0480: | 92 | 63 | 09 | 53 | 07 | B9 | 60 | A1 | B9 | 20 | 23 | 60 | 34 | D9 | 27 | 34 |
| 0490: | D9 | B9 | 61 | A1 | 19 | A1 | 8A | 10 | 83 | 85 | 95 | B8 | 61 | F0 | AB | 18 |
| 04A0: | F0 | AA | 4B | 96 | BA | 85 | B8 | 70 | F0 | 03 | 01 | A0 | AB | 18 | F0 | 13 |
| 04B0: | 00 | A0 | AA | D3 | 02 | 96 | BA | A0 | 84 | A6 | 15 | B4 | AF | 9A | FB | 86 |
| 04C0: | C2 | 05 | 54 | 4C | C6 | CF | B8 | 61 | F0 | 18 | 40 | 96 | D4 | 14 | F0 | B9 |
| 04D0: | 6F | F1 | 96 | E3 | BE | 05 | 74 | DB | FD | 80 | 37 | D2 | 99 | B9 | 0D |
| 04E0: | 74 | F4 | 83 | 04 | 13 | B8 | FD | 09 | 12 | EC | B8 | FC | 53 | 07 | B9 | 65 |
| 04F0: | A1 | 80 | D1 | 53 | 06 | 83 | 00 | 00 | 00 | 00 | 00 | 00 | 00 | 00 | 00 | 00 |
| 0500: | BE | 06 | BF | F0 | A5 | B9 | 65 | 80 | D1 | 32 | 5A | EF | 07 | A5 | B5 | EE |
| 0510: | 07 | B9 | AD | 04 | 11 | AC | 09 | D8 | 12 | 27 | FC | C6 | 21 | 54 | 6D | A4 |
| 0520: | 23 | 54 | 64 | FA | 4B | C6 | 47 | FC | 96 | 49 | FA | F2 | 4C | BF | 01 | B6 |
| 0530: | 33 | BF | FF | FC | C6 | 3A | FF | 37 | 17 | AF | F8 | 67 | B9 | 65 | F1 | 77 |
| 0540: | F7 | 6F | 53 | 07 | A1 | F4 | E4 | 27 | 83 | FA | F2 | 2D | 23 | FF | 83 | FE |
| 0550: | B9 | 65 | D1 | 21 | 19 | 61 | C9 | D1 | 53 | 06 | 83 | B9 | FC | 81 | D2 | 5B |
| 0560: | 85 | B2 | 64 | 95 | B4 | 9C | 81 | D2 | 5B | B8 | 67 | FA | 96 | 75 | FB | C6 |
| 0570: | 88 | 07 | 96 | 75 | 10 | F4 | E9 | 81 | 37 | D2 | 7F | F4 | E9 | 54 | 6D | 81 |
| 0580: | 37 | 12 | 8A | B4 | AF | F0 | 96 | 5B | A0 | 83 | B9 | 74 | FB | B6 | 91 | 37 |
| 0590: | 17 | 61 | A1 | 34 | E0 | BE | 05 | 74 | DB | 27 | A4 | 88 | 97 | 46 | A0 | A7 |
| 05A0: | 42 | F7 | AB | B9 | FC | 81 | F7 | FB | F7 | AB | 27 | F7 | AA | 4B | 83 | FA |
| 05B0: | D5 | AA | C5 | FB | D5 | AB | 8A | 04 | B9 | 74 | B1 | 00 | B9 | 6B | F1 | 92 |
| 05C0: | C3 | B6 | F0 | B9 | 61 | 9A | EF | B8 | 66 | FB | B6 | D3 | B0 | 02 | 61 | A1 |
| 05D0: | FA | A4 | DC | B0 | FE | 37 | 97 | A7 | F5 | 33 | 87 | 19 | 71 | A1 | 37 |
| 05E0: | F2 | EE | C9 | F1 | 6B | AB | 19 | F1 | 7A | AA | 27 | A1 | C9 | A1 | C4 | 37 |
| 05F0: | E4 | 9F | 00 | 00 | 00 | 00 | 00 | 00 | 00 | 00 | 00 | 00 | 00 | 00 | 00 | 00 |
| 0600: | 54 | 41 | C6 | 0C | BF | 88 | 23 | B8 | 54 | C6 | C4 | 14 | 94 | E5 | C6 | 14 |
| 0610: | D4 | D6 | 96 | D2 | 94 | E5 | B9 | F1 | 97 | F7 | C9 | 61 | 53 | 07 | AE |
| 0620: | 54 | 1D | B9 | 67 | F1 | 96 | B8 | FA | 67 | FB | 67 | 03 | FC | E6 | B8 | C6 |
| 0630: | B8 | 03 | 04 | AA | AC | FB | 53 | 01 | AB | 54 | 1D | FE | 43 | D0 | B6 | 42 |
| 0640: | D3 | 18 | 39 | B9 | 6C | A1 | D3 | 18 | B9 | 6E | A1 | 53 | E7 | C9 | A1 | B9 |
| 0650: | 7E | FA | 03 | EF | F6 | 5D | FA | 07 | 61 | E3 | AD | C4 | 66 | BD | 0F | 1D |
| 0660: | FD | 61 | E3 | 6A | E6 | 5F | B4 | 00 | B4 | 50 | C6 | 80 | 1A | B4 | 00 | AE |
| 0670: | B9 | 6D | 76 | 79 | FF | 17 | 6D | F6 | 7A | C9 | F1 | 39 | B4 | 4F | 96 | C2 |
| 0680: | EA | 6D | C4 | A6 | BF | F0 | B9 | 65 | 80 | D1 | 32 | 92 | EF | 88 | B9 | 4D |
| 0690: | C4 | C4 | AE | FF | 37 | B9 | 7E | 61 | E3 | 6C | B9 | 6E | F2 | 9F | C9 | F1 |
| 06A0: | 39 | B4 | 4F | 96 | BE | CC | FC | 03 | EF | F6 | 84 | FC | 6B | AB | BC | 00 |

-continued

| | | | | | | | | | | | | | | | | |
|---|---|---|---|---|---|---|---|---|---|---|---|---|---|---|---|---|
| 06B0: | B4 | 2D | B9 | 7F | F1 | AD | E4 | 00 | FE | 43 | 18 | 39 | E4 | 32 | B9 | 6D |
| 06C0: | C4 | C4 | B9 | 5D | 74 | F4 | FA | BA | 00 | 54 | 6F | FC | 54 | 6F | 54 | 6D |
| 06D0: | E4 | 32 | B9 | BD | 04 | 11 | F4 | E4 | 80 | AF | F4 | E4 | B9 | 64 | F1 | 03 |
| 06E0: | A0 | 27 | F6 | E7 | 17 | C4 | E8 | 07 | B9 | 65 | 61 | DF | 53 | 06 | 83 | 00 |
| 06F0: | 00 | 00 | 00 | 00 | 00 | 00 | 00 | 00 | 00 | 00 | 00 | 00 | 00 | 00 | 00 | 00 |
| 0700: | FD | 37 | 17 | AF | B9 | 65 | 80 | D1 | 32 | 0E | EF | 06 | E4 | 32 | AE | FB |
| 0710: | B9 | 7E | 61 | E3 | 77 | B9 | 6E | 6F | 6D | F6 | 1C | C9 | F1 | 39 | B4 | 4F |
| 0720: | 96 | 30 | 09 | D8 | 12 | 27 | CB | B4 | 2D | FB | 96 | 00 | 89 | 38 | E4 | 4A |
| 0730: | C4 | BE | FA | 89 | 38 | B6 | 3D | F2 | 3F | 23 | 58 | E4 | 41 | F2 | 39 | 23 |
| 0740: | C0 | B9 | FE | 91 | B4 | 00 | B4 | 50 | B4 | 15 | 96 | 32 | FC | B6 | 55 | 96 |
| 0750: | 57 | 23 | 90 | E4 | 59 | 96 | 51 | 23 | 68 | B9 | FE | 91 | BF | 3C | B9 | 65 |
| 0760: | 80 | D1 | 32 | 87 | EF | 60 | FB | 4A | 96 | 32 | 23 | 60 | B9 | FE | 91 | 99 |
| 0770: | DF | B9 | 64 | A1 | 44 | 74 | B9 | FE | 91 | F4 | A5 | F6 | 32 | 54 | 4C | 96 |
| 0780: | 8B | 54 | 2F | 74 | AA | E4 | 9F | B4 | 50 | E4 | 48 | B8 | 6B | B0 | 10 | B8 |
| 0790: | 61 | F0 | 18 | 40 | 96 | 9F | B8 | 67 | 8A | F0 | C6 | 9F | 14 | F0 | B9 |
| 07A0: | 68 | B1 | 00 | C5 | 83 | 94 | E5 | BE | 03 | BF | 00 | 80 | D1 | 32 | B5 | EF |
| 07B0: | AB | EE | AB | 97 | 83 | B4 | 50 | B4 | 15 | D4 | D6 | 96 | DF | B9 | 65 | F1 |
| 07C0: | B9 | 75 | A1 | B4 | 2D | BF | 80 | 80 | B9 | 65 | D1 | 32 | D9 | F4 | E2 | 80 |
| 07D0: | D1 | 32 | A5 | F4 | E4 | EF | C7 | 97 | 83 | F4 | E2 | F1 | B9 | 65 | A1 | 97 |
| 07E0: | A7 | 83 | B9 | 75 | F8 | D3 | 01 | A8 | 83 | 27 | 65 | 8A | 0C | 62 | 45 | 9A |
| 07F0: | F7 | 83 | 00 | 00 | 00 | 00 | 00 | 00 | 00 | 00 | 00 | 00 | 00 | 00 | 00 | 00 |

To those skilled in the art to which this invention applies, the achievement of improvements in methods and apparatus for controlling the position of a data transducer in rotating disk data storage equipment will be appreciated. Many changes in construction and widely differing embodiments and applications of the invention will suggest themselves without departing from the spirit and scope of this invention. The disclosures and the description herein are purely illustrative and are not intended to be in any sense limiting.

We claim:

1. In a method for digitally controlling a continuous torque generating rotary actuator for a data transducer in a rotating disk data storage device having a multiplicity of concentric data tracks on at least one major surface of a said rotating disk in order to move said transducer from one said track to a selected other of said tracks in response to track selection information supplied from a host machine to which said device is connected and to keep said transducer centered in each selected track, said method comprising the steps of:

a. sensing an initial position of said transducer and storing said sensed position as a digital number;
   b. receiving and storing as a digital number each track selection command;
   c. electro-optically sensing movement of said transducer, converting said sensed movement to polyphase signals, processing said polyphase signals to define track boundaries, putting out said track boundary signals as digital signals, and digitally counting said boundaries relative to said stored initial sensed position depending on the direction of movement of said transducer away from or towards said initial sensed position, so that said transducer location is always known by digital counting;
   d. calculating a seek command for said transducer in response to each said received and stored track selection command in reference to said counted transducer location;
   e. moving said transducer from its present location to a said selected track by operating said actuator in response to said digital seek command and said sensed track boundary signals and signalling arrival of said transducer at said selected track to said host;
   f. reading prestored data on a sector portion of said disk with said transducer, converting said read data to digital information, processing said digital information to generate a track centerline offset correction number, converting said number to analog and applying it, in conjunction with a selected one of said polyphase signals, to said actuator to move said transducer into alignment with centerline of said track and keep it aligned there while said transducer is located at said track.

2. In a method for digitally controlling a continuous torque generating rotary actuator for a data transducer in a rotating disk data storage device having a multiplicity of concentric data tracks on at least one major surface of a said rotating disk in order to move said transducer from one said track to a selected other of said tracks in response to track selection information supplied from a host machine to which said device is connected and to keep said transducer centered in each selected track, said method comprising the steps of:

a. calibrating said transducer by commanding said actuator to move said transducer to a reference track and verifying electrically that said transducer has reached said track;
   b. receiving and storing as a digital number each track selection command;
   c. electro-optically sensing movement of said transducer, converting said sensed movement to polyphase signals, processing said polyphase signals to define track boundaries, putting out said track boundary signals as digital signals, and digitally counting said boundaries up and down depending on the direction of movement of said transducer away from or towards said reference track so that transducer location is always known;
   d. calculating a seek command for said transducer in response to a each said received and stored track selection command in reference to said counted transducer location;
   e. moving said transducer from its present location to a said selected track by operating said actuator in response to said digital seek command and said sensed track boundary signals and signalling arrival of said transducer at selected track to said host;
   f. closed loop servoing said transducer to keep it aligned with centerline of said track during data transfer operations of said device by selecting and applying one of said polyphase signals to control said actuator as a coarse track boundary servo signal, and by reading prestored data on a sector portion of said disk outside of the data storage area thereof with said transducer, converting said read prestored data to digital information, processing said digital information to generate a track centerline offset correction number, converting said number to an analog value and applying it as a fine servo track centerline signal to control said actuator.

3. In a method for digitally controlling a continuous torque generating rotary actuator for a data transducer in a rotating disk data storage device having a multiplicity of concentric data tracks on at least one major surface of a said rotating disk in order to move said transducer from one said track to a selected other of said tracks in response to a series of stepping pulses forming track selection information supplied from a host machine to which said device is connected and intended to operate a stepper motor of a conventional disk drive, thereby enabling emulation of said conventional device, said method comprising the steps of:
  a. sensing an initial position of said transducer and storing said sensed position as a digital number;
  b. detecting the arrival of the first pulse of said series of pulses and simultaneously receiving a step direction command from said host and thereupon commanding said actuator to move said transducer to an adjacent track in accordance with said step direction command, and accumulating the next received ones of said series in a counter;
  c. after said transducer has reached said adjacent track, rereading said counter, and commanding said actuator to move said transducer to the track corresponding to the count read from said counter, and repeating said steps of counting said pulses of said series, reading said counts and moving said transducer until a destination track corresponding to the number of pulses received is reached;
  d. electro-optically sensing movement of said transducer, converting said sensed movement to polyphase signals, processing said polyphase signals to define track boundaries, putting out said track boundary signals as digital signals, and digitally counting said boundaries relative to said stored initial sensed position depending on the direction of movement of said transducer away from or towards said initial sensed position, so that said transducer location is always known by digital counting;
  e. calculating a seek command for said transducer in response to said count read from said counter in reference to said counted transducer location and using said seek command to command said actuator to move said transducer in a plurality of movements from the departure track to said destination track;
  f. signalling arrival of said transducer at said destination track to said host.

4. The method set forth in claim 1, 2 or 3 wherein said step for moving said transducer from its present location to a said selected track includes the steps of:
  a. prestoring a digital velocity profile for said transducer for each available track seek;
  b. selecting the appropriate one of the stored digital profiles for a track seek being commanded;
  c. digitally commanding said actuator to generate maximum accelerative torque during approximately the first half of said seek;
  d. digitally commanding said actuator to generate maximum decelerative torque or to coast during approximately the last half of said seek, depending upon the actual position of said transducer as compared to the position of said selected profile;
  e. digitally commanding a servo controlling said actuator to close loop and step said transducer from track to track when it has reached the vicinity of said selected track.

5. The method set forth in claim 1, 2 or 3 further comprising the steps of:
  a. prerecording in said sector for each track two bursts of equal length, frequency and amplitude, one of which is offset by an amount on one side of track centerline, and the other of which is offset by said amount on the other side of track centerline, and one of which is read by the transducer before the other;
  b. reading each said burst and generating a peak amplitude signal therefrom;
  c. converting each said peak amplitude signal to a digital value and storing each said digital value;
  d. comparing the two stored digital values for a track to determine any difference in amplitude; and,
  e. calculating said track centerline offset correction number from said comparison.

6. The method set forth in claim 5 further comprising the steps of:
  a. arranging the tracks of said data surface into zones;
  b. reading said two bursts for representative tracks within each said zone, said tracks being selected to include one each of said polyphases, converting said read bursts to said centerline offset correction numbers as aforesaid, and storing said numbers;
  c. starting fixed duration timers for each of said stored numbers when each is stored;
  d. resetting a said timer whenever a track's bursts are read and a centerline offset correction number for that track is recalculated and restored;
  e. rereading a track's bursts and recalculating its centerline offset correction number whenever a seek is made to that track and its representative timer has already elapsed.

7. The method set forth in claim 1 or 2 further comprising the steps of:
  a. measuring the alignment of the electro-optically sensed track boundaries with the track centerline offset correction number when a new track is to be sought and before the transducer leaves the departure track;
  b. adjusting the phase of the polyphase signals in the event that the measured alignment shows a disparity in excess of a predetermined value.

8. In a data storage device including a frame, a rotating data storage disk journalled to said frame, a read and write data transducer in proximity to a major surface of said disk, and a transducer carriage mechanism for positioning said transducer at one of a multiplicity of concentric data tracks on said disk during data read and/or write mode in substantially unrestricted data format within each track, and for moving said transducer from track to track during track seeking operations of said device, said device comprising in combination:
  driver means drivingly connected to said transducer carriage mechanism for arcuately moving said transducer from one location to a selected other location of said disk surface during track seek mode, and for maintaining said transducer at a selected location during read and/or write mode;

coarse position sensor means mechanically linked between said frame and said carriage mechanism for sensing radial position of said transducer relative to said surface and generating recurrent sensed polyphase signals throughout the range of movement of said mechanism across said surface, each of said polyphase signals being cyclical in nature and having generally linear servo-range portions separated by non-linear portions, said signals being angularly displaced so that the non-linear portion of one occurs approximately in the middle of the linear portion of another;

polyphase signal multiplier means connected to receive said sensed polyphase signals and to generate additional derived polyphase signals which are angularly displaced from said original signals;

analog signal selector means connected to select any one of said sensed and derived polyphase signals;

servo control loop means connected to said signal selector and to said driver means for phase locking said driver means to keep said transducer positioned at a selected location corresponding to a data track as defined by a selected polyphase signal;

analog comparator means connected to receive and compare said sensed and derived polyphase signals to provide counting signals which mark track boundaries of the data tracks;

controller means connected to said comparator means for incrementing and decrementing in accordance with said counting signals as said mechanism moves said transducer back and fourth across said disk surface so that said controller means thereby constantly monitors transducer track position, said controller means connected for receiving an externally supplied track select command and connected to control said driver means for causing said mechanism to move to a selected track during track seek mode, said controller connected to control said analog signal selector means to select for said servo control loop means the one of said polyphase signals corresponding in phase with the selected track during data read and/or write mode; whereby said servo control loop means follows said selected one of said polyphase signals and controls said driver means to keep said transducer at the selected track during data read and/or write mode of said device.

9. The device set forth in claim 8 wherein said polyphase signal multiplier means is internally connected to generate said additional derived polyphase signals with a predetermined angular displacement relative to said sensed polyphase signals.

10. The device set forth in claim 8 wherein said polyphase signal multiplier means is connected to said controller means, and said controller means calculates angular displacement values which are sent to said multiplier means and used thereby to generate said additional derived polyphase signals with commanded angular displacements relative to said sensed polyphase signals.

11. The device set forth in claim 8 wherein said controller is connected to receive true track centerline data from said data transducer and to select between sensed polyphase signals and derived polyphase signals for said servo control loop in accordance with whichever said group of signals affords the greatest servo control range as determined by reference to said true track centerline data.

12. The device set forth in claim 8 wherein said controller is connected to count said counting signals and to select between said sensed and derived polyphase signals in order to increase the number of tracks on said data surface over those capable of definition by sensed polyphase signals only.

13. The device set forth in claim 11 further comprising:

index detector means electromechanically coupled to said disk for detecting each rotation thereof, for generating an index signal marking each said rotation and sending said signal to said controller;

said disk surface being prerecorded with a servo sector wherein each track is provided with two staggered bursts which are equally and oppositely offset from track centerline, said sector having a known position relative to said index signal;

peak detector means connected to receive data from said transducer and controlled by said controller means for integrating each burst as read by said transducer to provide a peak signal thereof and for supplying each said peak signal to said controller means;

said controller means for separately recording each peak signal and for determining the difference in amplitude therebetween as a measure of error of position of said transducer from track centerline and for controlling said driver means to correct for any said error of position.

14. The device set forth in claim 13 wherein a reference track is provided with a unique identifier in its servo sector, and said controller means is connected to said transducer to sense said unique identifier and thereby know that said transducer is located at said reference track.

15. The device set forth in claim 8 wherein said controller means constantly and recurrently monitors the operation of said device, and further comprising operating condition latch and display means connected to said controller means, for displaying one of a plurality of operating condition codes as provided by said controller means.

16. The device set forth in claim 12 wherein said disk surface is divided into a plurality of concentric zones, each zone having a multiplicity of data tracks therein, and each zone having plural selected tracks therein representative of each phase of said polyphase signals, said controller means connected to read said peak signals from said servo bursts for each said representative data track and to store said resultant measured error position as a correction signal for each said track of said zone of same phase, said controller means further connected to reread and update said reference correction signals periodically.

* * * * *